United States Patent
Gregory et al.

(10) Patent No.: US 11,703,471 B1
(45) Date of Patent: Jul. 18, 2023

(54) TRACE DETECTION OF CHEMICAL COMPOUNDS VIA CATALYTIC DECOMPOSITION AND REDOX REACTIONS

(71) Applicant: University of Rhode Island Board of Trustees, Kingston, RI (US)

(72) Inventors: Otto J. Gregory, Narragansett, RI (US); Peter Ricci, III, West Warwick, RI (US); Andrew Rossi, Portsmouth, RI (US)

(73) Assignee: University of Rhode Island Board of Trustees, Kingston, RI (US)

( * ) Notice: Subject to any disclaimer, the term of this patent is extended or adjusted under 35 U.S.C. 154(b) by 716 days.

(21) Appl. No.: 16/724,068

(22) Filed: Dec. 20, 2019

Related U.S. Application Data

(60) Provisional application No. 62/782,555, filed on Dec. 20, 2018.

(51) Int. Cl.
| | |
|---|---|
| *G01N 25/36* | (2006.01) |
| *B01J 23/52* | (2006.01) |
| *B01J 35/02* | (2006.01) |
| *G01N 25/34* | (2006.01) |

(52) U.S. Cl.
CPC .............. *G01N 25/36* (2013.01); *B01J 23/52* (2013.01); *B01J 35/023* (2013.01); *G01N 25/34* (2013.01)

(58) Field of Classification Search
CPC ......... G01N 25/36; G01N 25/34; B01J 23/52; B01J 35/023
See application file for complete search history.

(56) References Cited

U.S. PATENT DOCUMENTS

| | | | |
|---|---|---|---|
| 3,258,415 | A | 6/1966 | Kordesch |
| 3,296,113 | A | 1/1967 | Hansen |
| 4,056,395 | A | 11/1977 | Sato et al. |
| 4,587,104 | A | 5/1986 | Yannopoulos |
| 4,663,205 | A | 5/1987 | Hayashi et al. |

(Continued)

OTHER PUBLICATIONS

Diaz Aguilar, A., et al., "A hybrid nanosensor for TNT vapor detection", Nano Letters, vol. 10, Issue 2, 2010, 380-384.

(Continued)

*Primary Examiner* — Brian J. Sines
(74) *Attorney, Agent, or Firm* — Peacock Law P.C.; Philip D. Askenazy

(57) ABSTRACT

Methods and apparatuses for highly sensitive detection of analytes using redox reactions. A library of heat reactions of analytes of interest with a variety of catalysts at a variety of temperatures is prepared. An array of sensors with low thermal mass heating elements is prepared, depositing the same or different catalysts, such as metal oxide catalysts that have multiple oxidation states, on each heating element. The low thermal mass heating elements are preferably not in thermal contact with a substrate, or a low mass substrate is used. The array is exposed to a sample at various temperatures. The sign and magnitude of the heat effect of the redox reaction of compounds in the sample or their decomposition products with each catalyst is measured and compared with the library. The catalysts and temperatures are chosen so that the desired analytes have a unique pattern of heat effect signs and magnitudes when reacted with those catalysts at those temperatures. The resulting detector is highly selective and sensitive to the analytes of interest.

25 Claims, 21 Drawing Sheets

(56) References Cited

U.S. PATENT DOCUMENTS

| | | | |
|---|---|---|---|
| 5,137,924 A | 8/1992 | Short et al. |
| 5,474,618 A | 12/1995 | Allaire |
| 5,731,510 A | 3/1998 | Jones et al. |
| 5,942,676 A | 8/1999 | Potthast et al. |
| 5,997,832 A | 12/1999 | Lieber et al. |
| 6,171,378 B1 | 1/2001 | Manginell et al. |
| 6,341,892 B1 | 1/2002 | Schmermund |
| 6,498,046 B2 | 12/2002 | McCarron et al. |
| 6,550,310 B1 | 4/2003 | Liu et al. |
| 7,147,695 B2 | 12/2006 | Mitra |
| 7,329,389 B2 | 2/2008 | Horovitz et al. |
| 7,498,066 B2 | 3/2009 | Kumar et al. |
| 7,581,434 B1 | 9/2009 | Discenzo et al. |
| 7,687,016 B1 | 3/2010 | Dicarlo et al. |
| 7,972,863 B2 | 7/2011 | Trugstad et al. |
| 8,052,324 B2 | 11/2011 | Gregory et al. |
| 8,894,918 B2 | 11/2014 | Dicarlo et al. |
| 9,759,699 B1 | 9/2017 | Gregory et al. |
| 2001/0003249 A1 | 6/2001 | Stormbom |
| 2004/0241870 A1 | 12/2004 | Miller et al. |
| 2005/0011260 A1 | 1/2005 | Arndt et al. |
| 2005/0109621 A1 | 5/2005 | Hauser et al. |
| 2005/0260453 A1 | 11/2005 | Jiao et al. |
| 2006/0254501 A1 | 11/2006 | Wang et al. |
| 2007/0056624 A1 | 3/2007 | Gregory et al. |
| 2007/0105341 A1 | 5/2007 | Sosnowchik et al. |
| 2008/0025366 A1 | 1/2008 | McBurney |
| 2008/0093226 A1 | 4/2008 | Briman et al. |
| 2008/0148815 A1 | 6/2008 | Lucas et al. |
| 2008/0223504 A1 | 9/2008 | Ohno |
| 2009/0218235 A1 | 9/2009 | McDonald et al. |
| 2009/0235862 A1 | 9/2009 | Cha et al. |
| 2009/0249859 A1 | 10/2009 | Takahashi |
| 2009/0290614 A1 | 11/2009 | Gregory et al. |
| 2010/0213603 A1 | 8/2010 | Smeys et al. |
| 2011/0128828 A1 | 6/2011 | Naniwa et al. |
| 2011/0149465 A1 | 6/2011 | Hashimoto et al. |
| 2011/0165046 A1 | 7/2011 | Drews et al. |
| 2011/0222582 A1 | 9/2011 | Subramanian et al. |
| 2011/0280279 A1 | 11/2011 | Gregory et al. |
| 2011/0299562 A1 | 12/2011 | Hashemian |
| 2012/0041246 A1 | 2/2012 | Scher et al. |
| 2012/0192623 A1 | 8/2012 | Adami et al. |
| 2012/0301360 A1 | 11/2012 | Meinhold et al. |
| 2013/0020670 A1 | 1/2013 | Hori et al. |
| 2013/0125386 A1 | 5/2013 | Gregory et al. |
| 2013/0244896 A1 | 9/2013 | Lizarraga-Lopez et al. |
| 2014/0036953 A1 | 2/2014 | Kimura et al. |
| 2014/0212979 A1 | 7/2014 | Burgi et al. |
| 2015/0316523 A1 | 11/2015 | Patolsky et al. |

OTHER PUBLICATIONS

"Revised Thermocouple Reference Tables: Type S, Omega Engineering, Stanford, CT", http://www.omega.com:80/temperature/Z/pdf/z208-209.pdf, 2001.

Ahmed, M. G., et al., "Comparison of Argon Triple Point between NIS-Egypt and LNE-INM/CNAM/France", Journal of Metrology Society of India, vol. 23, No. 1, 2008, 3-9.

Amani, M., et al., "Detection of triacetone triperoxide (TATP) using a thermodynamic based gas sensor", Sensors and Actuators B., vol. 162, 2012, 7-13.

Aniolek, Gregg E., et al., "Thin film thermocouples for advanced ceramic gas turbine engines", Surface and Coatings Technology, vol. 28/29, Elsevier Science, S.A., 1994, 70-75.

Buttgieg, G. A., et al., "Characterization of the explosive triacetone triperoxide and detection by ion mobility spectrometry", Forensic Sci. Int., vol. 135, 2003, 53-59.

Caron, Z., et al., "A Pre-Concentrator for Explosive Vapor Detection", Electrochemical Society Transactions, vol. 66, 2015, 38.

Chaston, J. C., "The Oxidation of the Platinum Metals", Platinum Metals Review, vol. 19, No. 4, 1975, 135-140.

Chen, C., et al., "Research, Development, and Demonstration of Exothermal Explosive Detection System Based on Microthermal Analysis", DOT/TSA/AR-ICC5372, Transportation Research and Development, Transportation Security Administration, Washington, D.C., Mar. 2003.

Chu, Y., et al., "Detection of Peroxides Using Pd/SnO2 Nanocomposite Catalysts", Sensors and Actuators: B Chemical, vol. 197, 2014, 376-384.

Dubnikova, F., et al., "Decomposition of Triacetone Triperoxide is an Entropic Explosion", Journal of the American Chemical Society, vol. 127, No. 4, 2015, 1146-1149.

Dubnikova, F., et al., "Role of Metal Ions in the Destruction of TATP: Theoretical Considerations", Journal of Physical Chemistry A, vol. 115, No. 38, 2011, 10565-10575.

Ewing, R. G., et al., "A critical review of ion mobility spectrometry for the detection of explosives and explosive related compounds", Talanta, vol. 54, 2001, 515-529.

Garroway, A. N., et al., "Remote sensing by nuclear quadrupole resonance", IEEE Transactions on Geoscience and Remote Sensing, vol. 39, 2001, 1108-1118.

Gegner, J., et al., "Diffusivity and solubility of oxygen in solid palladium", J Mater Sci, vol. 44, Springer Science +Business Media, LLC, 2009, 2198-2205.

Gozani, T., et al., "Nuclear-based techniques for explosive detection", Journal of Energetic Materials, vol. 4, 1986, 377-414.

Gregory, Otto J., "Thermodynamic Based Gas Sensors for the Detection of Explosives and Explosive Precursors", University of Rhode Island, Research & Industrial Collaboration Conference 2011, Oct. 13, 2011.

Kim, B., et al., "Reduction of SnO2 with Hydrogen", Materials Transactions, vol. 52, 2011, 1814-1817.

Kreider, Kenneth G., et al., "High temperature materials for thin-film thermocouples on silicon wafers", This Sold Films, vol. 376, Elsevier Science S.A., 2000, 32-37.

Lew, S., et al., "The reduction of Zinc Titanate and Zinc Oxide Solids", Chemical Engineering Science, vol. 47, 1991, 1412-1431.

Li, X., et al., "Four-cantilever trace explosive sensors with dual SAMS functionalized for specific-sensing improvement and nonspecific-adsorption depression", Solid-State Sensors, Actuators and Microsystems Conference, 2007 Transducers 2007 International, IEEE, 2007, 999-1002.

Lin, H., et al., "A colorimetric sensor array for detection of triacetone triperoxide vapor", J. Am. Chem. Soc., vol. 132, 2010, 15519-15521.

Lin, A., et al., "Selectivity and long-term reliability of resonant explosive-vapor-trace detection based on antigen-antibody binding", Micro Electro Mechanical Systems, 2009 MEMS 2009 IEEE 22nd International Conference on IEEE, 2009, 316-319.

Mallin, D., "Increasing the Selectivity and Sensitivity of Gas Sensors for the Detection of Explosives", MS Thesis, University of Rhode Island, 2014.

Olsen, J. K., et al., "Differential thermal analysis microsystem for explosive detection", SPIE Defense, Security, and Photonics, Proc of SPIE, vol. 8031, 2011, 80312-1-6.

Pinnaduwage, L., et al., "A sensitive, handheld vapor sensor based on microcantilevers", Review of Scientific Instruments, vol. 75, 2004, 4554-4557.

Pinnaduwage, L., et al., "Explosives: A microsensor for trinitrotoluene vapour", Nature, vol. 425, 2003, 474.

Rasanen, R., et al., "Determination of gas phase triacetone triperoxide with aspiration ion mobility spectrometry and gas chromatography-mass spectrometry", Anal. Chim. Acta, vol. 623, 2008, 59-65.

Ray, R. S., et al., "Theoretical and experimental study of sensing triacetone triperoxide (TATP) explosive through nanostructured TiO2 substrate", Talanta, vol. 118, 2014, 304-311.

Rijinders, M. R., et al., "Pattern formation in Pt-SiC diffusion couples", Solid State Ionics, vol. 95, Elsevier Science B.V., 1997, 51-59.

Senesac, L. R., et al., "Micro-differential thermal analysis detection of adsorbed explosive molecules using microfabricated bridges", Review of Scientific Instruments, vol. 80, 2009, 035102-1-035102-9.

(56) References Cited

OTHER PUBLICATIONS

Spadaccini, C. M., et al., "Rapid thermal analysis of energetic materials with micro-fabricated differential scanning calorimeters". Solid-State Sensors, Actuators and Microsystems Conference, 2009, Transducers 2009 International, IEEE, 2009, 136-139.

Sysoev, V. V., et al., "Percolating SnO 2 nanowire network as a stable gas sensor: Direct comparison of long-term performance versus SnO 2 nanoparticle films", Sensors and Actuators B: Chemical, vol. 139, Issue 2, 2009, 699-703.

Todd, M., et al., "Application of mid-infrared cavity-ringdown spectroscopy to trace explosives vapor detection using a broadly tunable (6-8um) optical parametric oscillator", Applied Physics B, vol. 75, 2002, 367-376.

Tougas, Ian M., "Metallic and Ceramic Thin Film Thermocouples", Open Access Master's Theses, Paper 7, http://digitalcommons.uri.edu/theses/7, 2013.

Tougas, Ian M., et al., "Metallic and Cermic Thin Film Thermocouples for Gas Turbine Engines", Sensors, vol. 13, Nov. 8, 2013, 15324-15347.

Tougas, Ian M., et al., "Thin film platinum-palladium thermocouples for gas turbine engine application", Thin Solid Films, vol. 539, Elsevier B.V., 2013, 345-349.

Warmer, J., et al., "Detection of triacetone triperoxide using temperature cycled metal-oxide semiconductor gas sensors", Phys. Status Solidi A, vol. 212, No. 6, 2015, 1289-1298.

Wilkinson, J., et al., "Terahertz absorption spectrum of triacetone triperoxide (TATP)", Chem. Phys. Letters, vol. 178, 2009, 172-174.

Wrbanek, John D., et al., "Ceramic thin film thermocouples for SiC-based ceramic matrix composites", Thin Solid Films, doi:10.1016/j.tsf.2012.04.034, 2012.

Zhu, Y., et al., "Oxidation Mechanism of Copper at 623-1073K", Materials Transactions, vol. 4, 2002, 2173-2176.

TRACE DETECTION OF CHEMICAL COMPOUNDS VIA CATALYTIC DECOMPOSITION AND REDOX REACTIONS

CROSS-REFERENCE TO RELATED APPLICATIONS

This application claims priority to and the benefit of the filing of U.S. Provisional Patent Application No. 62/782,555, entitled "Trace Detection of Chemical Compounds Via Catalytic Decomposition and Redox Reactions", filed on Dec. 20, 2018, the specification and claims of which are incorporated herein by reference.

STATEMENT REGARDING FEDERALLY SPONSORED RESEARCH OR DEVELOPMENT

This invention was made with government support from the United States government under Grant No. 2013-ST-061-ED0001 awarded by the Department of Homeland Security. The government has certain rights in the invention.

BACKGROUND OF THE INVENTION

Field of the Invention (Technical Field)

The present invention is related to trace detection of chemical compounds by changing the oxidation state of the catalyst used to decompose the chemical compound by interaction with the compound or the decomposition products of the compound.

Background Art

Note that the following discussion may refer to a number of publications and references. Discussion of such publications herein is given for more complete background of the scientific principles and is not to be construed as an admission that such publications are prior art for patentability determination purposes.

SUMMARY OF THE INVENTION (DISCLOSURE OF THE INVENTION)

An embodiment of the present invention is a method of detecting an analyte, the method comprising depositing each of a plurality of catalysts on a separate low thermal mass heating element; heating the low thermal mass heating elements to a plurality of temperatures; contacting the catalysts with a sample; reacting the catalysts with one or more chemical compounds in the gaseous sample or with catalytic decomposition products of one or more of the chemical compounds; measuring a sign of a heat of reaction for each catalyst at each temperature; comparing the measured heat of reaction sign at each temperature obtained for each of the catalysts with predetermined data; and determining if the analyte is present in the sample. The sample is preferably gaseous. All of the catalysts are optionally different; alternatively, at least two of the catalysts are optionally the same. The method optionally further comprises measuring a magnitude of the heat of rection for each catalyst at each temperature; and comparing the measured heat of reaction magnitude at each temperature obtained for each of the catalysts with predetermined data. The method preferably comprises comparing power required to keep each low thermal mass heating element at each temperature with power required to keep an identical low thermal mass heating element but without a catalyst at the same temperature. The catalysts preferably comprise metal oxides, preferably selected from the group consisting of tin oxide, copper oxide, titanium oxide, tungsten oxide, manganese oxide, iron oxide, and zinc oxide. The catalysts optionally comprise nanoparticles such as palladium, gold, or platinum. The nanoparticles preferably improve the sensitivity of the low thermal mass sensors.

Each heating element optionally comprises a wire, such as a 25 µm diameter nickel wire, preferably about 1 cm in length. Each heating element preferably comprises a thin metallic film. The method optionally comprises depositing a passivation layer on each of the low thermal mass heating elements prior to depositing the catalysts. The passivation layer preferably comprises a thermodynamically stable material with high dielectric breakdown strength, such as alumina, hafnia, or silica. One or more of the catalysts preferably have multiple oxidation states. Reaction between one or more of the catalysts and at least one of the chemical compounds, or one or more catalytic decomposition products thereof, preferably changes the oxidation state of the one or more catalysts. The heating elements are preferably not in thermal contact with a substrate. The method is preferably capable of detecting a concentration of the analyte in the sample of less than about 1 ppb, and more preferably less than about 10 ppt. The mass of each low thermal mass heating element is preferably less than about 1 mg, more preferably less than about 45 µg, and even more preferably less than about 10 µg. The analyte is optionally selected from the group consisting of triacetone triperoxide (TATP), diacetone diperoxide (DADP), 2,4-Dinitrotoluene (2,4-DNT), acetone, hydrogen peroxide, tetrahydrocannabinol (THC), cannabidiol (CBD), ethanol, ketones, peroxides, pollutants, pharmaceuticals, hydrocarbons, and alcohols.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the figures.

DETAILED DESCRIPTION OF EMBODIMENTS OF THE INVENTION

Figure 1A:
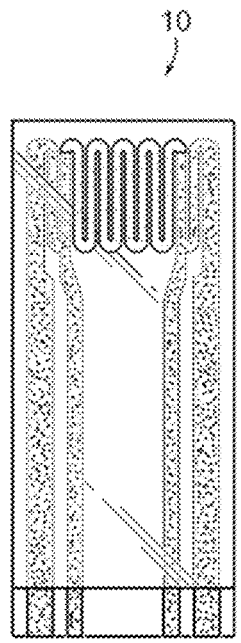
FIGS. 1A and 1B show illustrative diagrammatic views of a microsensor in accordance with an embodiment of the present invention, showing the top view (in FIG. 1A) and expanded view (in FIG. 1B) of the catalyst layer, the alumina passivation layer, the nickel microheater, and the alumina substrate.

Embodiments of the present invention relate to methods and apparatuses for detecting chemical compounds by using multiple catalysts, or different oxidation states of a single catalyst, to interact with the chemical compound, including but not limited to by decomposition. Chemical compounds of interest include explosive molecules such as triacetone triperoxide (TATP), explosive precursors such as hydrogen peroxide ($H_2O_2$), pharmacological compounds such as tetrahydrocannabinol (THC) and cannabidiol (CBD), and biological compounds such as ketones. The heat effect generated or absorbed by the catalyst, such as upon decomposition of the compound to be detected, is relatively constant over time compared to the electrical response, and also provides a more stable response as well as additional information when combined with a conductometric sensor. Such a sensor can measure changes in the electrical properties of the catalyst during exposure to the target gas, such as electrical conductivity, dielectric constant, and work function.

One or more embodiments of the present invention comprise a thermodynamic sensing platform capable of detecting compounds in the gas phase at trace levels. The platform preferably comprises two low thermal mass, thin film microheaters, one a catalyst-coated "active" microheater and the other an uncoated "reference" microheater. The microheaters are thermally scanned over a selected temperature range and the electrical power difference required to maintain the microheaters at the same temperature is the heat effect associated with catalytic activity. At a specific temperature, the power difference is determined by subtracting the reference signal from the "active" sensor signal. The electrical power difference between the two microheaters in the presence of the compound is the heat effect associated with oxidation/reduction reactions that occur on the surface of the catalyst after decomposition of the target molecule. Thus, the heat generated or absorbed by the catalyst in the presence of an analyte in ambient air is measured. These catalytic reactions are specific to a given catalyst, which can be optimized for the desired target molecule. The catalyst preferably comprises a metal oxide, for example SnO, CuO, WO, MnO, or ZnO, which is highly specific for a target molecule, and which has a high surface area for high sensitivity detection. In some embodiments the catalysts preferably comprise precious or heavy metal nanoparticles, such as palladium, gold, or platinum, loaded into the metal oxide. Some examples of metal oxides used for the catalysts are shown in Table 1.

TABLE 1

Sputtering conditions for various metal oxide catalysts.

| Catalyst | $Cu_2O$ | $Cu_2O$—CuO | SnO | ZnO | $V_2O_5$ | $WO_3$—$TiO_2$ |
|---|---|---|---|---|---|---|
| Target diameter (mm) | 150 | 150 | 150 | 150 | 125 | 150 |
| Target Material | Cu | CuO | $SnO_2$ | ZnO | V | W—Ti (90/10) |
| Power density ($W/cm^2$) | 1.77 | 1.98 | 1.98 | 1.98 | 2.45 | 1.77 |
| Voltage (V) | 1100 | 900 | 1150 | 950 | 1600 | 1400 |
| Gas pressure (Pa) | Ar: 1.1 Pa $O_2$: 0.3 Pa | Ar: 1.4 Pa | Ar: 1.4 Pa | Ar: 1.4 Pa | Ar: 1.1 Pa $O_2$: 0.3 Pa | Ar: 1.1 Pa $O_2$: 0.3 Pa |
| Deposition rate (μm/hr) | 0.17 | 0.9 | 0.8 | 1.1 | 0.06 | 0.13 |

Figure 1B:
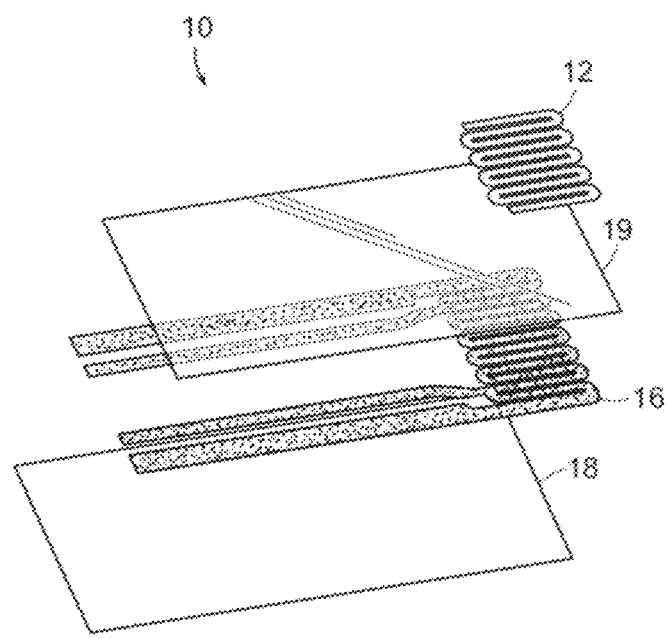

In accordance with one or more embodiments of the present invention, FIGS. 1A and 1B show microsensor 10 comprising catalyst layer 12, passivation layer 19, thin film microheater heating element 16, and substrate 18. FIG. 1B shows an exploded view of these layers. Passivation layer 19 and substrate 18 preferably comprise alumina and the microheater preferably comprises nickel, although any materials may be used. The passivation layer preferably comprises a thermodynamically stable material with high dielectric breakdown strength, such as alumina, hafnia, or silica. The use of the passivation layer is optional to prevent overlapping conductive catalyst from shorting two nearby portions of the heating element, in case of deposition, lithography or registration error, or in the event patterned deposition of the catalyst isn't possible or desirable. The oxide catalysts are preferably deposited directly onto the passivation layer in the pattern of the heating element so that uniform coverage of the heating element is assured. Other embodiments can comprise a fine wire heating element or free-standing thin film heating element without some or all of a passivation layer or substrate.

In one embodiment of the present invention, a test system of the present invention includes multiple sensors, preferably arranged in an array, each sensor preferably comprising a different catalyst, and/or alternatively comprising the same catalyst but operating at different temperatures. In particular, testing system 40 shown in FIG. 2 includes air source 42 that provides air to reference source 46 via micro flow controller 44 as well as to target source 50 via micro flow controller 48. The flow from the reference source 46 and target source 50 are provided to preconcentrator 52, and the output of the preconcentrator 52 is provided both to microheater/sensor 56 via micro flow controller 54 and to dynamic control sensor 60 via micro flow controller 58. Each of preconcentrator 52, microheater/sensor 56 and dynamic control sensor 60 is coupled to a computer 62 similar to the system shown in FIG. 7. Detectors and methods similar to those disclosed above are described in U.S. Pat. No. 9,759,699, and Amani et al., "Detection of triacetone triperoxide (TATP) using a thermodynamic based gas sensor", *Sensors and Actuators B*, 162 (2012) 7-13, incorporated herein by reference.

The sensing mechanism of the present invention can be exploited in a variety of embodiments and for a variety of analytes. In one embodiment, the sensing platform can be used in a continuous monitoring application for detecting explosives, for example those commonly used in improvised explosive devices (IEDs), at trace levels in the gas phase. Experiments using TATP, diacetone diperoxide (DADP), and 2,4-Dinitrotoluene (2,4-DNT) as the target molecules, as well as explosive precursors such as hydrogen peroxide or acetone, as well as other peroxides, have been conducted for which detection limits in the ppb range have been established. In another embodiment, the sensing platform can be used in a breathalyzer platform in which a person exhales into a tube that can be interrogated for the desired analyte. Implementation of thermodynamic sensors in a breathalyzer platform can be used to detect molecules such as tetrahydrocannabinol (THC) or cannabidiol (CBD) to determine if a person is under the influence of marijuana. A similar embodiment can detect low concentrations of ketones, such as acetone, in the breath, which can lead to a simple and rapid diabetes diagnosis. A portable detection system such as this can be used by consumers as a non-invasive alternative to blood testing for diabetes, or even by schools/hospitals as a method of detecting early onset diabetes. By tailoring the catalyst to the chemical compound to be detected, trace amounts of any chemical compound, including but not limited to pollutants, pharmaceuticals, and hydrocarbons, may be performed by the device of the present invention.

Figure 3:
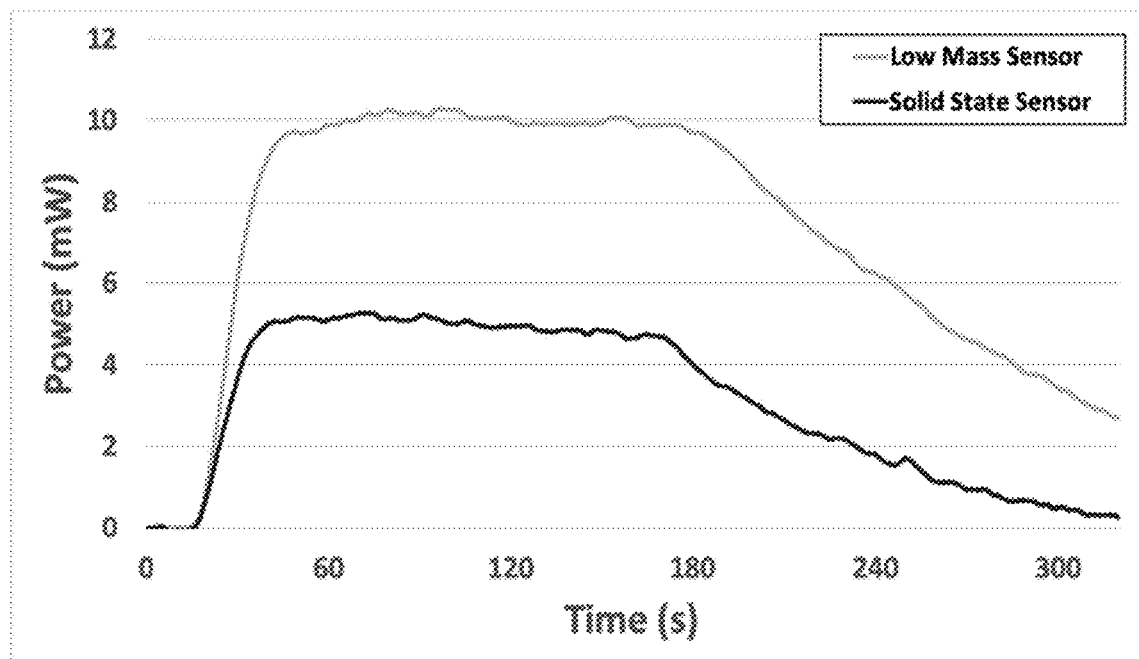
FIG. 3 shows responses of two thermodynamic sensors to 20 ppm TATP. The low thermal mass sensor (top curve) is considerably more responsive than the solid-state sensor (bottom curve). Both sensors employed a SnO catalyst and were exposed to TATP at 500° C.

The present invention preferably employs thin film heating elements on ultrathin substrates, or no substrate, to dramatically reduce the thermal mass of the heating elements. As used throughout the specification and claims, the term "heating element" means the more resistive portion of a heater or microheater that heats up when current is passed through it. The use of low thermal mass heating elements improves response time, selectivity, sensitivity (detection limits), signal-to-noise ratio, and reduced noise floor when compared with larger thermal mass sensors. It is preferable that as thin a substrate as possible is used, or even no substrate (especially under the heating element), since the substrate contributes most of the thermal mass to the heating element. As used throughout the specification and claims, the term "low thermal mass" means less than 190 mg. In general, the thermal mass of the heating element is preferably as low as possible, preferably less than 190 mg, more preferably less than 75 mg, even more preferably less than 1 mg, even more preferably less than 45 μg, and most preferably less than 10 μg. FIG. 3 shows the response time and magnitude of sensor comprising a low thermal mass heating element of an embodiment of the present invention (48 μg nickel wire heating element with no substrate) and a large thermal mass solid-state sensor (190 mg) of the prior art (a 9 micron thick nickel microheater/heating element on a 1 mm thick alumina substrate) to 20 ppm TATP. The magnitude of the response of the low mass sensor (10 mW)

is considerably larger than the response of the larger thermal mass (190 mg) solid state sensor (5 mV/V) under the same humidity levels. By reducing the thermal mass of the heating element, the response time for detection is drastically reduced, as shown by the slopes of the power curves shown in FIG. 3. Not only was the response time of the sensor with a low thermal mass heating element greatly improved over the sensor with a high thermal mass heating element, but the sensitivity of the former to TATP and 2,4-DNT was also greatly improved. Heating elements of the present invention are preferably so low in thermal mass that they would remain a low thermal mass heating element, with most if not all of the benefits, even if their size was increased to accommodate an increased catalyst surface area to increase the sensitivity of the sensor. A low thermal mass heating element also enables the use of the present detector scheme in a MEMS device. Furthermore, compounds may be detected at even lower levels by combining metal oxide catalysts in a way that takes advantage of the pathway identified for detection.

The unique responses of the metal oxide catalysts in the present invention demonstrates unprecedented selectivity using the low thermal mass sensing platform. An oxidation/reduction reaction takes place on the metal oxide catalyst surface that is responsible for the observed heat effects. These heat effects are specific to both the individual catalyst and its oxidation state as well as the molecule being detected. Utilizing reduction/oxidation reactions, the platform can be optimized for a specific analyte by operating an array of sensors with multiple catalysts, or a sensor comprising an array of multiple catalysts. These sensors can operate independently and rely on the reduction/oxidation reactions of the metal oxide to selectively detect various analytes. Implementation of these sensors in a detection system could utilize a variety of sensors employing different catalysts, for example SnO, CuO, ZnO, FeO, etc., which are thermally scanned over the desired temperature range. By choosing the appropriate temperature set points, the redox reactions of these catalysts can be deployed in a manner that ensures selectivity for one or more desired analytes. For example, detection of TATP can be achieved by operating a $Cu_2O$ coated sensor above 275° C., per Example 3, and the SnO coated sensor above 375° C., per Example 2. Operating at these set points guarantees two distinct responses (endothermic for SnO and exothermic for $Cu_2O$) that are selective for TATP. By using a catalyst having multiple oxidation states, detection and identification of the molecule can be performed by analyzing the heat effect (magnitude and sign) corresponding to the oxidation state and/or the change from one oxidation state to another. Simply determining the sign of the thermal reaction (endothermic vs. exothermic) at certain temperatures with certain catalyst(s) may provide a simple, fast, and highly selective method for detecting one compound, or for simultaneously detecting a plurality of chemical compounds.

Figure 4:
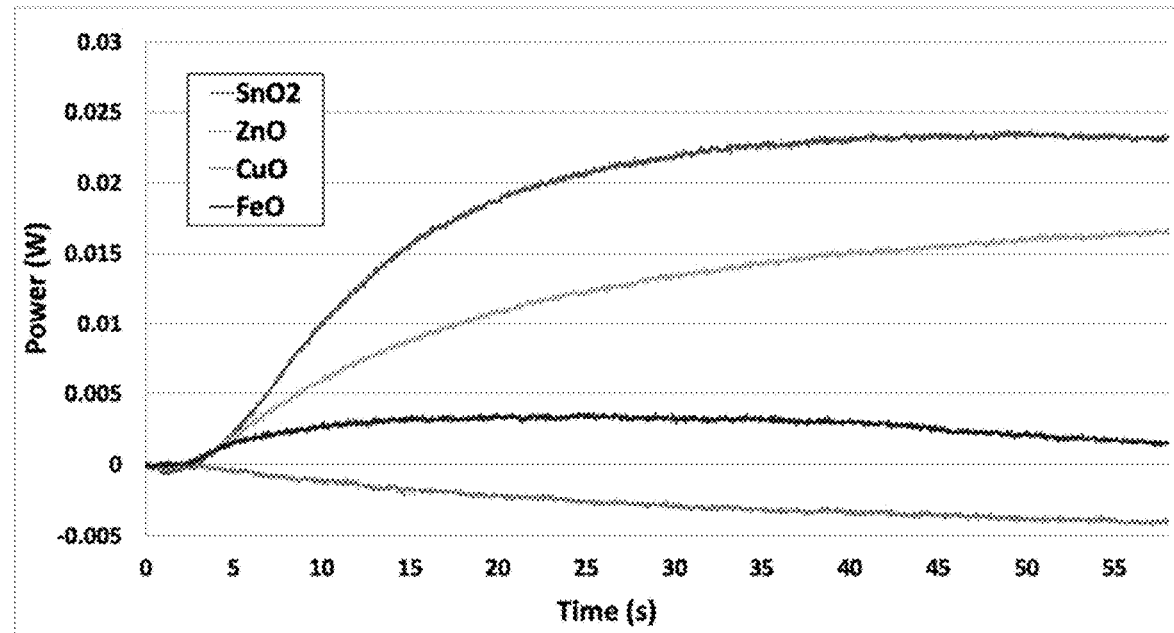
FIG. 4 shows sensor responses to 20 ppm TATP at 175° C., using four different oxide catalysts (SnO, CuO, ZnO, and FeO).
Figure 5:
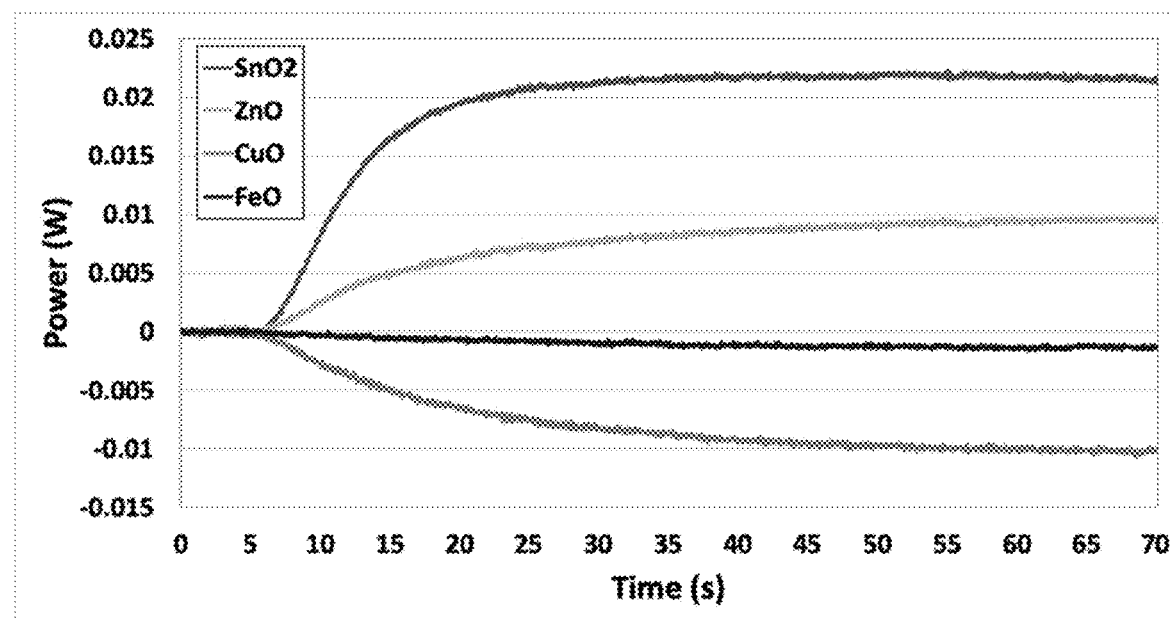
FIG. 5 shows sensor responses to 15 ppm DADP at 175° C., using four different oxide catalysts (SnO, CuO, ZnO, and FeO).
Figure 6:
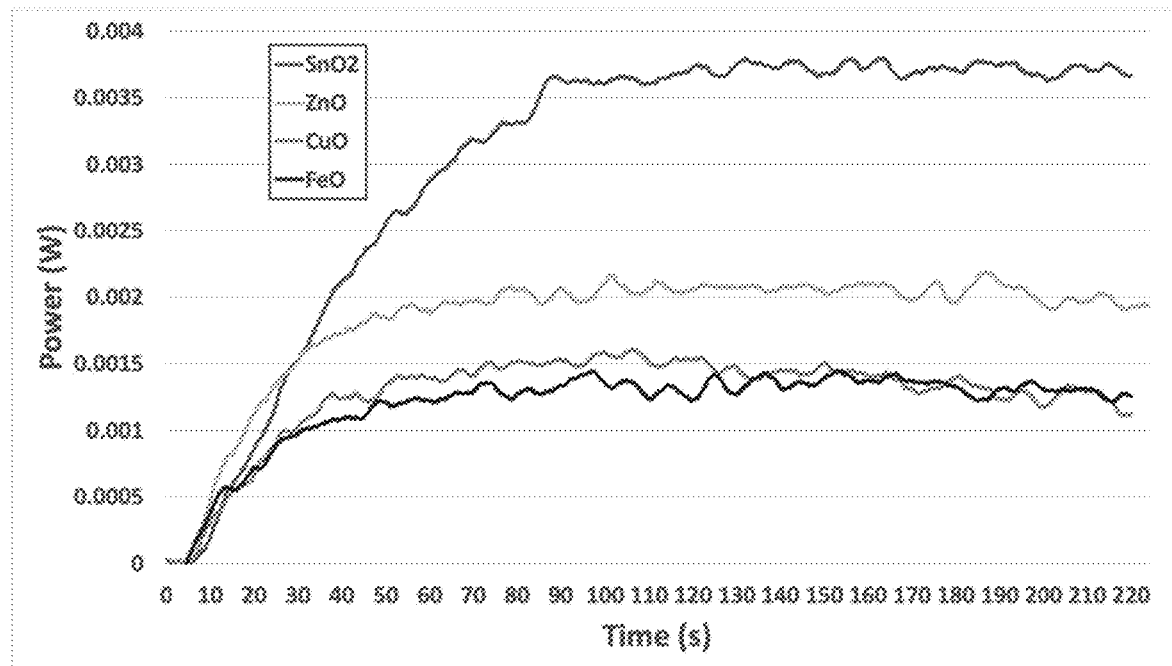
FIG. 6 shows sensor responses to 180 ppb 2,4-DNT at 175° C., using four different oxide catalysts (SnO, CuO, ZnO, and FeO).

An array of microheaters permits a single analyte to interact with numerous metal-oxide catalysts simultaneously and produce a series of distinct responses that may represent a "fingerprint" for the analyte. FIGS. 4-6 show the responses at 175° C. of four microheaters employing different catalysts (SnO, CuO, ZnO, and FeO) to TATP, DADP, and 2,4-DNT respectively. A summary of the resulting responses for each analyte is shown in Table 2.

TABLE 2

Responses of a variety of catalysts to multiple analytes

|  | SnO | CuO | ZnO | FeO |
|---|---|---|---|---|
| TATP (20 ppm) | Endothermic | Exothermic | Endothermic | Endothermic |
| DADP (15 ppm) | Endothermic | Exothermic | Endothermic | No Response |
| 2,4-DNT (180 ppb) | Endothermic | Endothermic | Endothermic | Endothermic |

As shown above, an array consisting of four microheaters each with a different metal-oxide catalyst can be used to uniquely identify an analyte by generating a unique "fingerprint" based on corresponding heat effects for each analyte. Here, TATP generated three endothermic responses using three different catalysts (SnO, ZnO, and FeO), and an exothermic response for CuO. DADP (diacetone diperoxide) generated two endothermic responses (SnO and ZnO), one exothermic response (CuO), and one response in which the interaction with the catalyst did not generate a heat effect (FeO). Even though DADP and TATP have similar molecular structures, this array of catalysts was able to selectively identify unique "fingerprints" for each molecule. Similar results were also shown for 2,4-DNT in which all four catalysts uniquely displayed endothermic responses upon exposure to the analyte. Furthermore, the array may additionally or alternatively comprise microheaters each with the same catalyst but operated at different temperatures, where the type of response at each temperature can help identify an analyte (such as the data shown in Example 2).

Example 1

Thin film nickel microheaters having a nominal thickness of 4.5 μm were deposited onto laser-perforated alumina substrates using an MRC 822 sputtering system. The substrate was 6 mm×12 mm and the sensor weighed 190 mg. The nickel microheaters were annealed in flowing nitrogen at 900° C. for 5 hours to improve the electrical stability and eliminate point defects as a result of the sputtering process. A 1 μm thick alumina passivation layer was then deposited over the nickel microheater. The alumina layer was also used to prevent possible interactions with oxygen and other gases present in the atmosphere. A $SnO_2$/Pd nanocomposite film was then deposited onto the passivation layer above the microheater surface, as shown in FIG. 1B, in an MRC 8667 sputtering machine by co-sputtering from simultaneously energized $SnO_2$ and Pd targets. The nanocomposite catalysts were prepared preferably by incorporating palladium nanoparticles of different loadings in a $SnO_2$ matrix.

Palladium-tin oxide combinatorial libraries were used to screen catalysts co-sputtered from metal palladium and $SnO_2$ targets for optimal selectivity to TATP as opposed to $H_2O_2$. Tin was present in largely the Sn4+ state while palladium was present in both the Pd2+ and Pd4+ oxidation state. This resulted in a large number of essentially different catalysts with a continuously varying, spatially dependent chemistry. Palladium loadings ranged from 2 wt. % to 25 wt. % in the nanocomposite. Following deposition, the films were annealed at 550° C. in an air ambient to promote crystallization and further stabilize the catalysts. The chemical composition and morphology of these catalysts were characterized using scanning electron microscopy (SEM) equipped with energy dispersive x-ray spectroscopy (EDS). The catalysts were also characterized using x-ray diffraction (XRD) and x-ray photoelectron spectroscopy (XPS). Pure tin oxide films were also prepared as catalysts for comparison purposes. Compared with a pure $SnO_2$ catalyst, several unique features in the response versus temperature curves were observed for the catalysts that were doped with palladium, which greatly improved the magnitude of responses to both TATP and $H_2O_2$. Sensors with various palladium doping levels also exhibited very different characteristics to the target molecules: the catalyst with an 8 wt. % palladium loading yielded the greatest selectivity while a 12 wt. % palladium loading provided maximum sensitivity.

Figure 7:
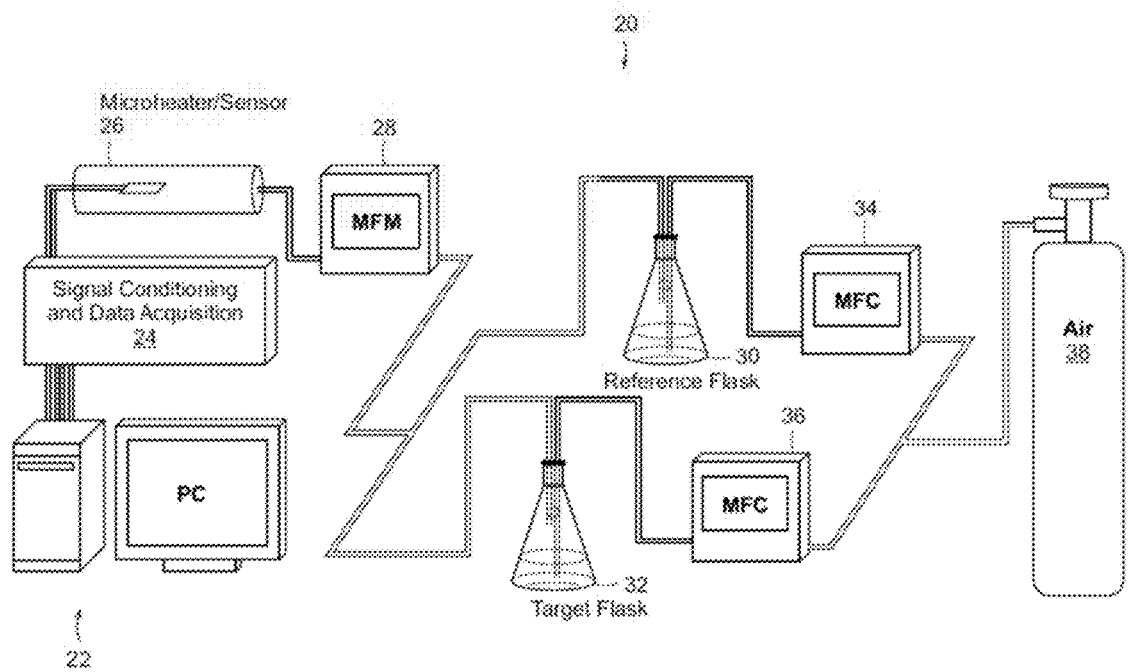
FIG. 7 shows an illustrative diagrammatic view of an apparatus used for the detection of triacetone triperoxide (TATP), hydrogen peroxide ($H_2O_2$), and acetone using a micro-calorimetric sensor in accordance with an embodiment of the present invention.

A schematic view of the test bed used to evaluate sensor performance is shown in FIG. 7. In particular, the testing system 20 included a computer 22 that includes a signal conditioning and data acquisition module 24, both of which were coupled to microheater sensor 26. Microheater sensor 26 received input from micro flow meter 28 via dual paths. One path included reference flask 30 in communication with air source 38 via micro flow controller 34. The other path included target flask 32 in communication with air source 38 via micro flow controller 36. The flow rate of inert gas (dry air) and target gas was precisely metered into the testing chamber using the two mass flow controllers and a digital flow meter, which produced a constant mass flow and allowed precise control over the target gas and inert gas mixtures delivered to the test bed. The desired vapor phase concentration of TATP (e.g. 0.68 µg/ml) was achieved by passing a carrier gas over a piece of filter paper impregnated with high purity TATP crystals maintained at room temperature. When the target molecules were derived from liquid-based chemical solutions such as $H_2O$, or acetone in deionized water, air was bubbled through the flask containing dilute solutions to establish an equilibrium partial pressure in the vapor phase.

The catalytic response was determined by measuring the heat affect associated with the interaction of the target molecules with a catalyst using a dynamic testing protocol. The catalyst-coated microheater was heated to a series of predetermined temperature set points by controlling the electrical resistance of the microheater, measured via the four point probe method. The temperature coefficient of resistance of the nickel microheater was independently calibrated and verified prior to each test. The gas delivery system and data acquisition system were computer controlled using LabView software.

After reaching each target set point temperature, the sensor was allowed to equilibrate for 360 seconds under constant inert gas flow. The target gas was then introduced into the test chamber for 180 seconds and then the reference gas was introduced for 180 seconds before the microheater was ramped to the next temperature set point. The power required to maintain the sensor at a particular temperature was recorded after the target gas was introduced and this temperature was maintained until the start of next step increase in temperature. The heat effect at each temperature set point was measured by taking the difference in power required to be applied to or removed from the sensor in order to maintain its temperature in the presence of the target gas (PT) from the target flask, and the power required to be applied to or removed from the sensor in order to maintain its temperature in the presence of the inert gas (PR) from the reference flask. Prior to measuring the sensor response, the background power or drift was subtracted from the sensor response. Typically, all responses smaller than ±1.0 mW were considered background noise, which was due to small variations in the target and inert gas flow rates, drift in the nickel microheaters and other sources of electrical noise.

Figure 8A:
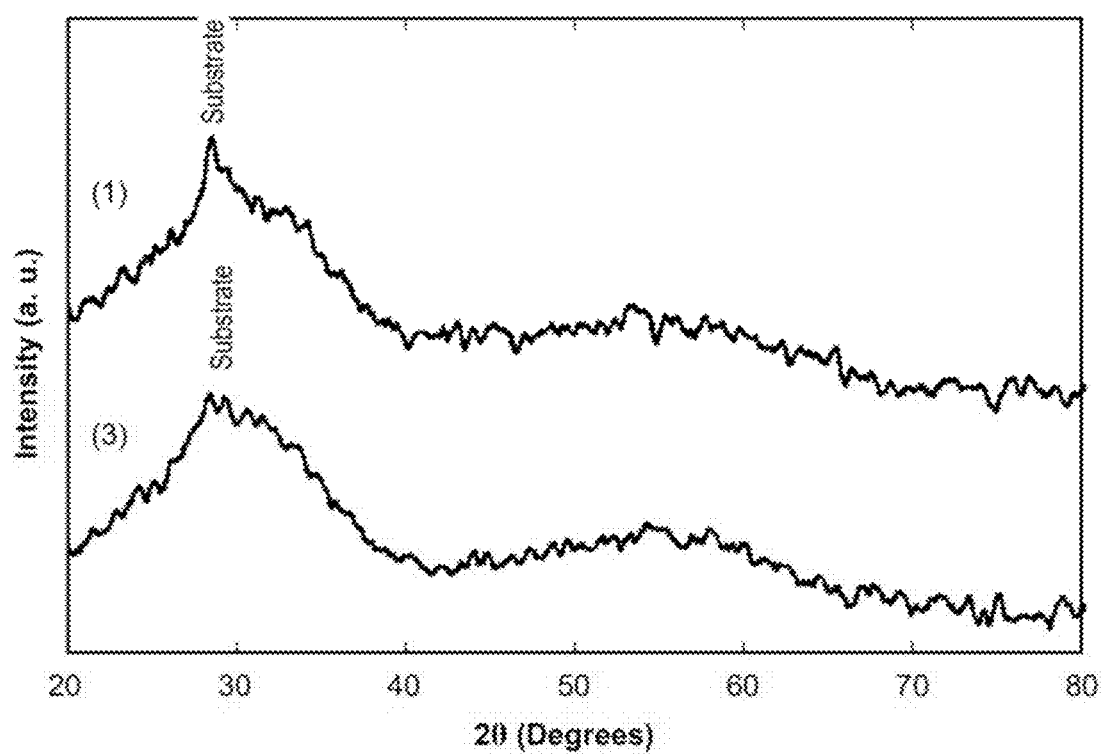
FIGS. 8A and 8B show illustrative graphical representations of x-ray diffraction (XRD) patterns of as-deposited (shown in FIG. 8A) and annealed films with (shown in FIG. 8B) 8 wt. % loading Pd (1), 2.5 wt. % loading Pd (2), and 1 wt. % loading Pd (3) in the Pd:$SnO_2$ nanocomposite catalyst.
Figure 8B:
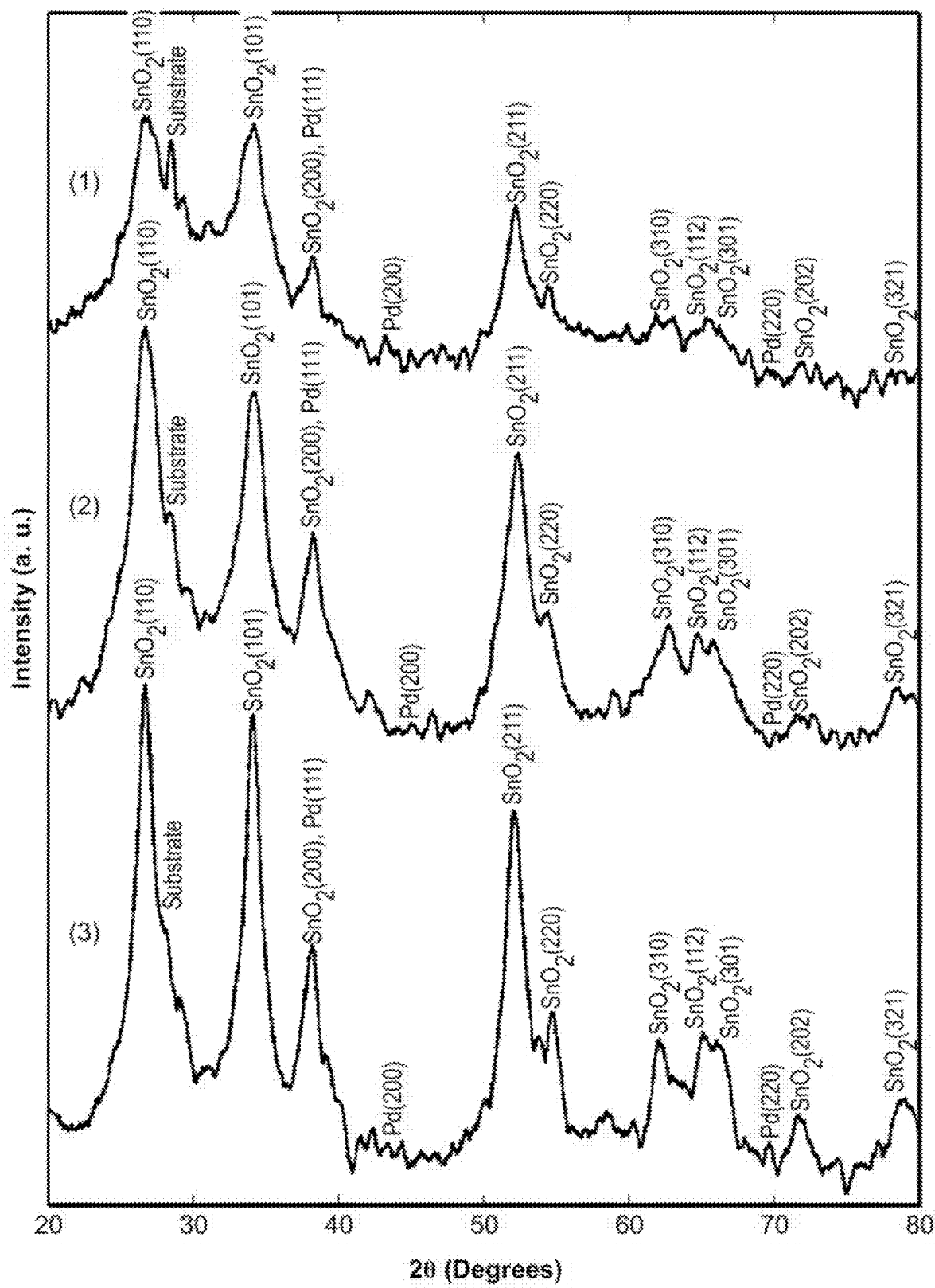

Catalysts incorporating a dispersion of palladium nanoparticles in a tin oxide matrix were characterized by XRD, in both the as-deposited and annealed condition, the XRD patterns for which are shown in FIGS. 8A and 8B respectively, with 8 wt. % loading Pd (1), 2.5 wt. % loading Pd (2), and 1 wt. % loading Pd (3) in the Pd:SnO2 nanocomposite catalyst. All of the nanocomposite catalysts, regardless of composition, were amorphous in the as-deposited condition and crystalline or partially crystalline after subsequent annealing. Peaks corresponding to the rutile form of $SnO_2$ were observed in the XRD patterns of the annealed films with no preferred orientation or texture evident. A uniform $2\theta$ shift of (0.01 Å) was also observed for the $SnO_2$ diffraction peaks relative to the literature value, which was likely caused by substitutional defects.

Figure 9A:
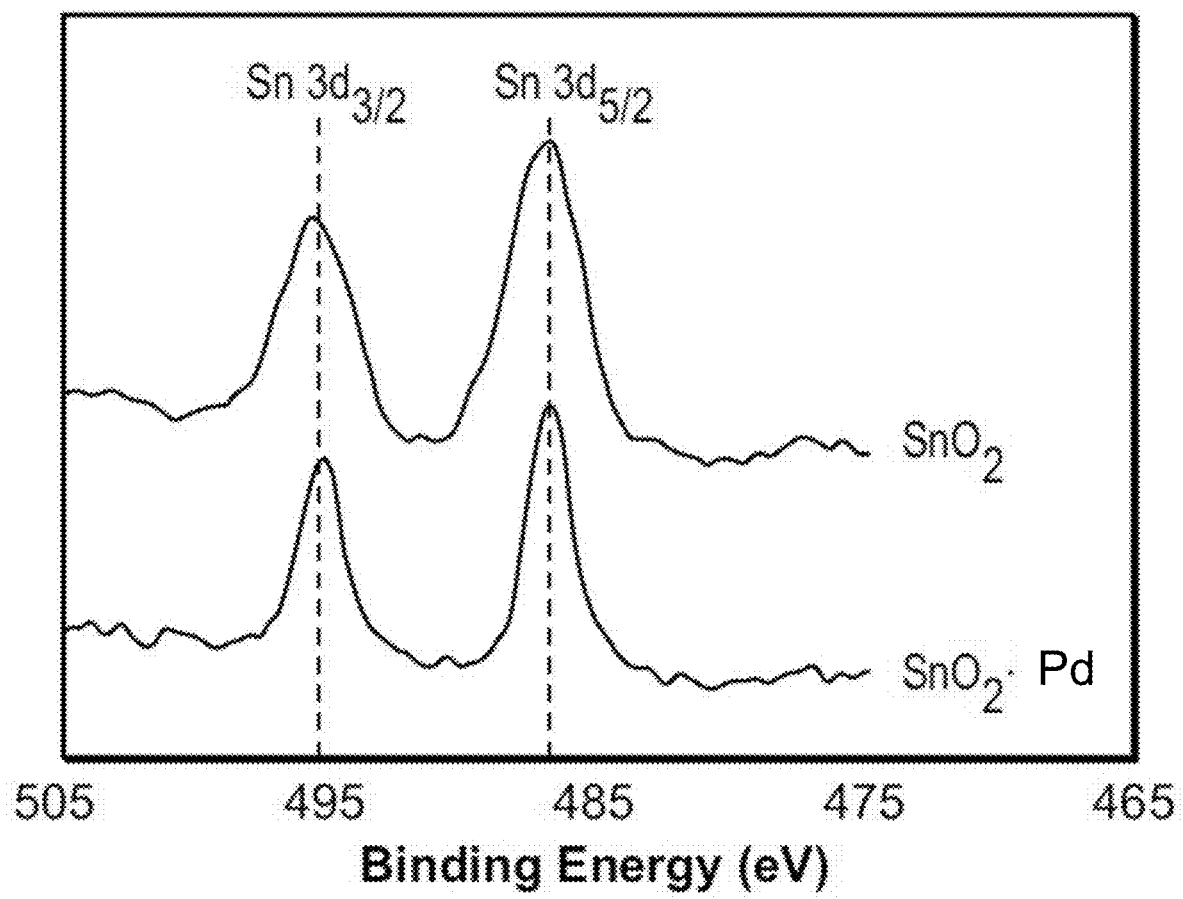
FIGS. 9A and 9B show illustrative graphical representations of x-ray photoelectron spectroscopy (XPS) spectra of Sn 3d doublet for Pd doped and undoped $SnO_2$ (shown in FIG. 4A), and Pd 3d doublet corresponding to 2.2 wt. % loading Pd, 12 wt. % loading Pd and 38 wt. % loading Pd in the Pd$SnO_2$ nanocomposite (shown in FIG. 9B).
Figure 9B:
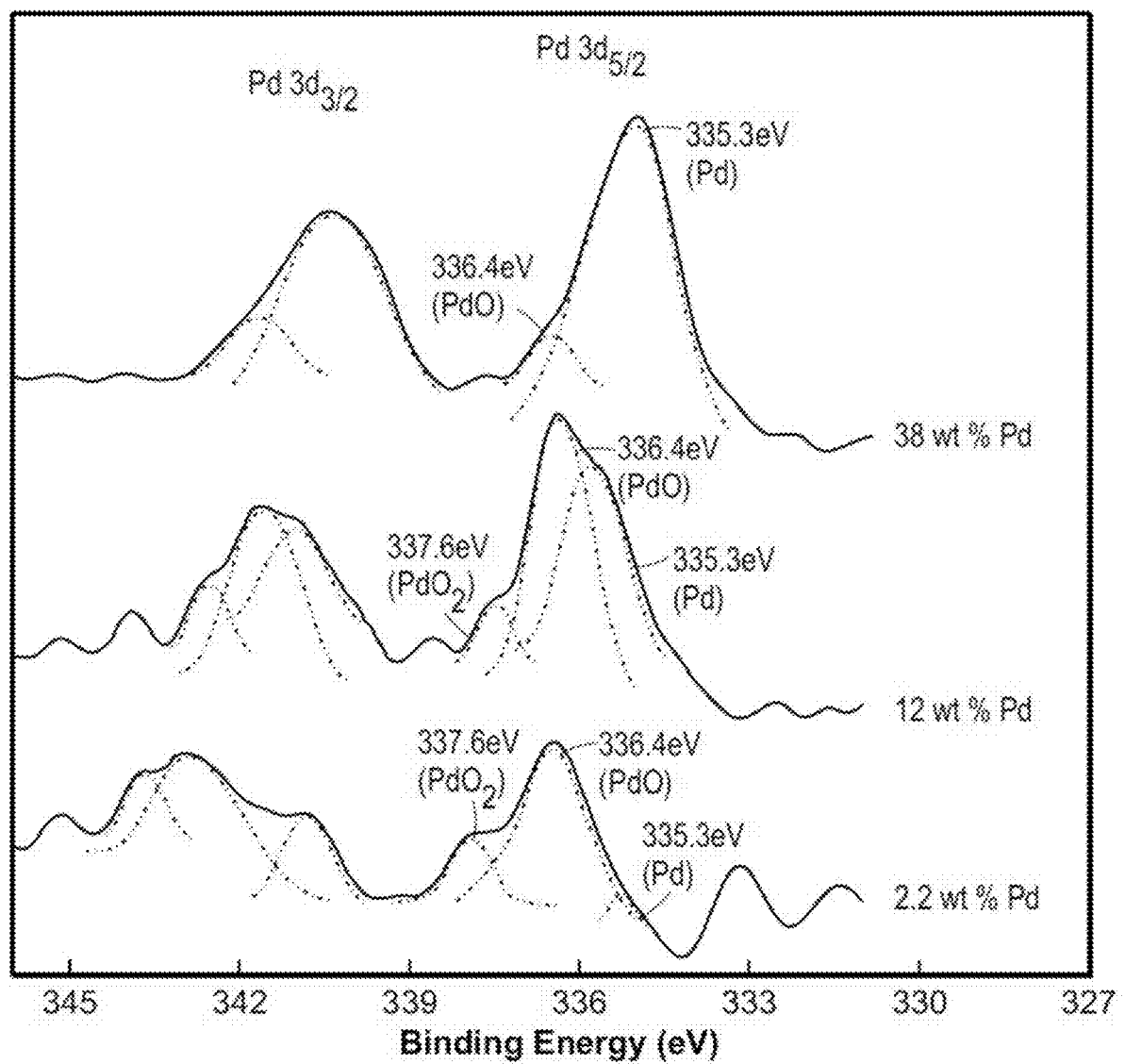

The oxidation states of the nanocomposite catalysts after exposure to hydrogen peroxide and TATP were characterized using XPS. As shown in FIG. 9A, the XPS spectrum of pure $SnO_2$ and Pd doped $SnO_2$ exhibited the same Sn 3d5 core level peak at 486.5 eV, suggesting that tin was present in +4 oxidation states in both specimens. Pure $SnO_2$ contains +2 state tin as indicated by the slight shifting of the main peak. As shown in FIG. 9B, the Pd 3d5 peaks in the 2.2 wt. % nanocomposite were observed at 336.4 eV and 337.5 eV respectively, which is in good agreement with literature values corresponding to palladium in the +2 and +4 states. The relative composition (at. %) was estimated to be 0.17: 0.83 based on the peak area. As the palladium doping level was increased to 12 wt. %, metallic palladium started to phase separate and the composition of $PdO_2$:PdO:Pd became 0.054:0.522:0.423. When the palladium doping level reached 32 wt. %, the metallic component became dominant while the $PdO_2$ peak disappeared along with the PdO peak. This is because palladium single crystals are more difficult to oxidize and the palladium particles in the $SnO_2$ are easier to oxidize. This finding is in good agreement with the disappearance of the palladium (220) peak indicated in the XRD pattern of the nanocomposite.

Figure 10A:
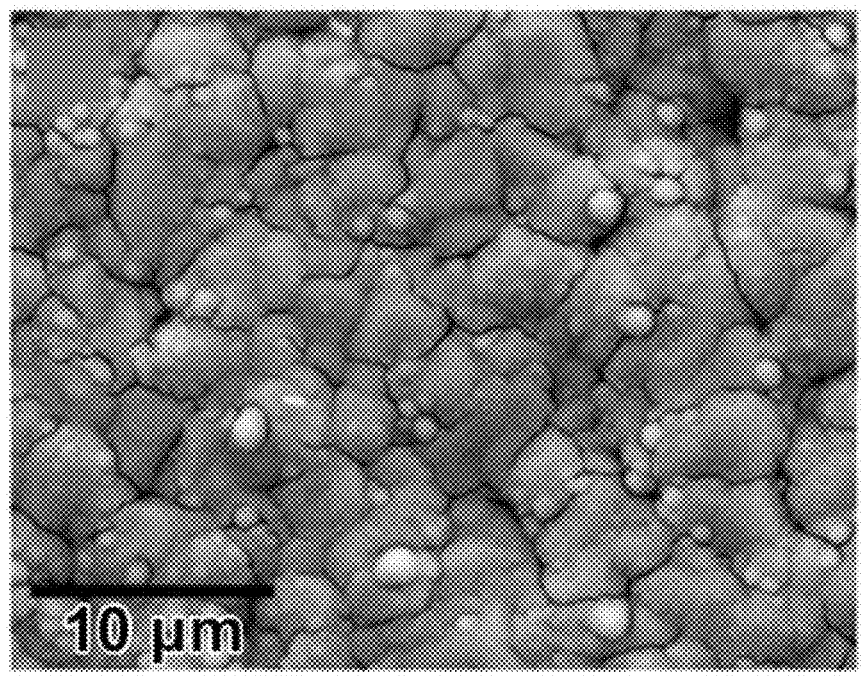
FIGS. 10A and 10B show illustrative microphotographic views of scanning electron microscopy (SEM) (shown in FIG. 10A) and transmission electron microscopy (TEM) (shown in FIG. 10B) micrographs of as-annealed nanocomposite catalyst with a 12 wt. % palladium loading.
Figure 10B:
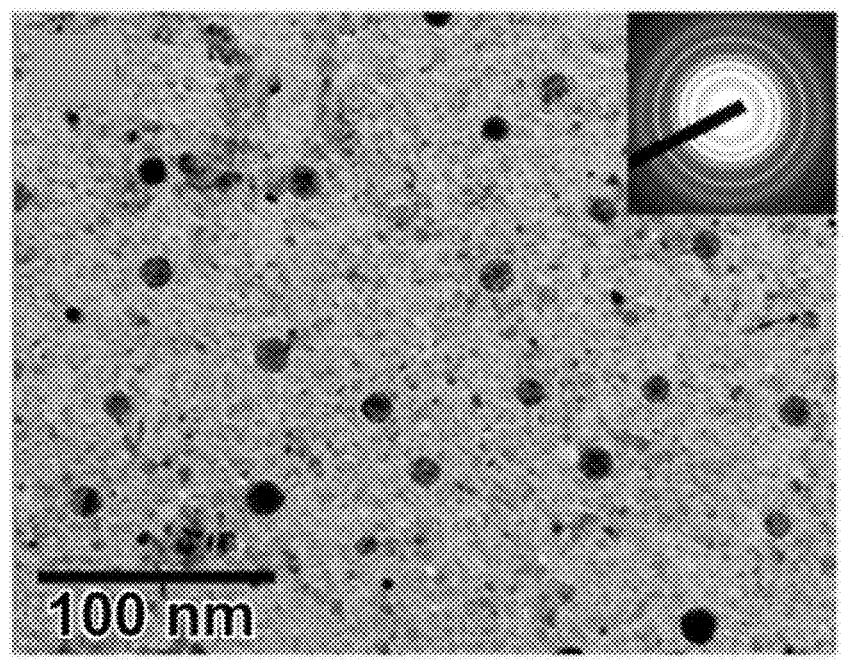

The catalyst morphology after annealing was imaged by SEM and TEM as shown in FIGS. 10A and 10B respectively. While most of the as-deposited films were featureless, as might be expected with an amorphous film, extensive micro-cracking was observed in the catalysts after annealing. This was attributed to the large volume change associated with crystallization of the nanocomposite. In addition, as the palladium content in the nanocomposite was increased, the density of micro-cracks diminished and eventually disappeared from the microstructure when palladium loadings greater than 25 wt. % were realized. EDS analysis was used in conjunction with TEM to determine the chemistry of the dark spherical particles observed in the $SnO_2$ matrix. These were palladium particles with an average diameter of 20 nm, and EDS confirmed the presence of palladium in the $SnO_2$ matrix.

Figure 11:
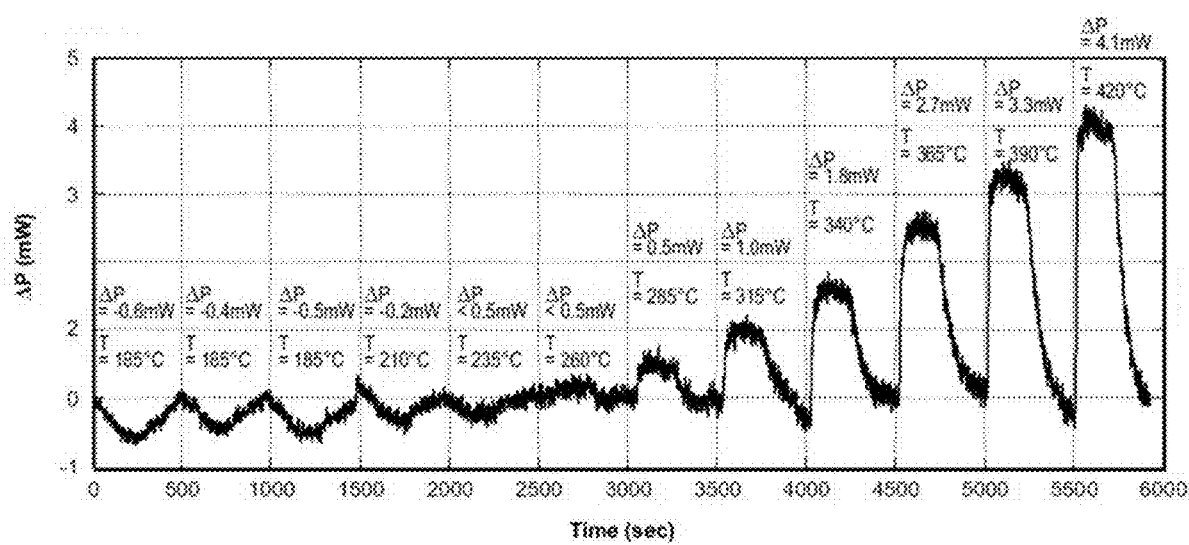
FIG. 11 shows an illustrative graphical representation of a response of micro-calorimetric sensor to 0.68 μg/ml TATP using an $SnO_2$ catalyst thermally scanned to various temperature set points.

Baseline experiments using an un-doped $SnO_2$ catalyst at several temperature set points in the presence of 0.68 µg/ml TATP were conducted. FIG. 11 illustrates the off-on-off protocol used for each run. At temperatures below 240° C., a slightly exothermic reaction was observed at the surface of the $SnO_2$ catalyst. However, as the temperature was increased, the reaction tended to be endothermic and peaked at 420° C. Accompanying the change in sign of the response was a change in the reaction kinetics, which was apparent from the reduced response time for the exothermic reaction when compared to the endothermic sensor response. These sign changes are particular to the uniqueness of the sensor response or signature, and along with the magnitude of response are able to reduce false positives.

Figure 12A:
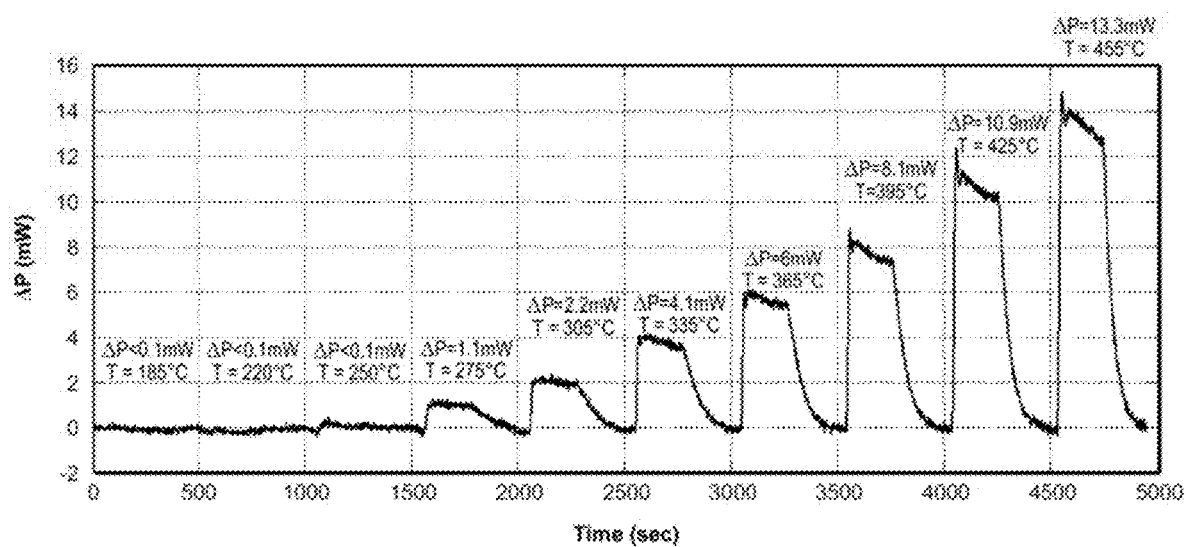
FIGS. 12A and 12B show illustrative graphical representations of responses of a 12 wt. % Pd nanocomposite catalyst to 0.225 μg/ml $H_2O_2$ (shown in FIG. 12A) and 0.68 μg/ml TATP (shown in FIG. 12B).
Figure 12B:
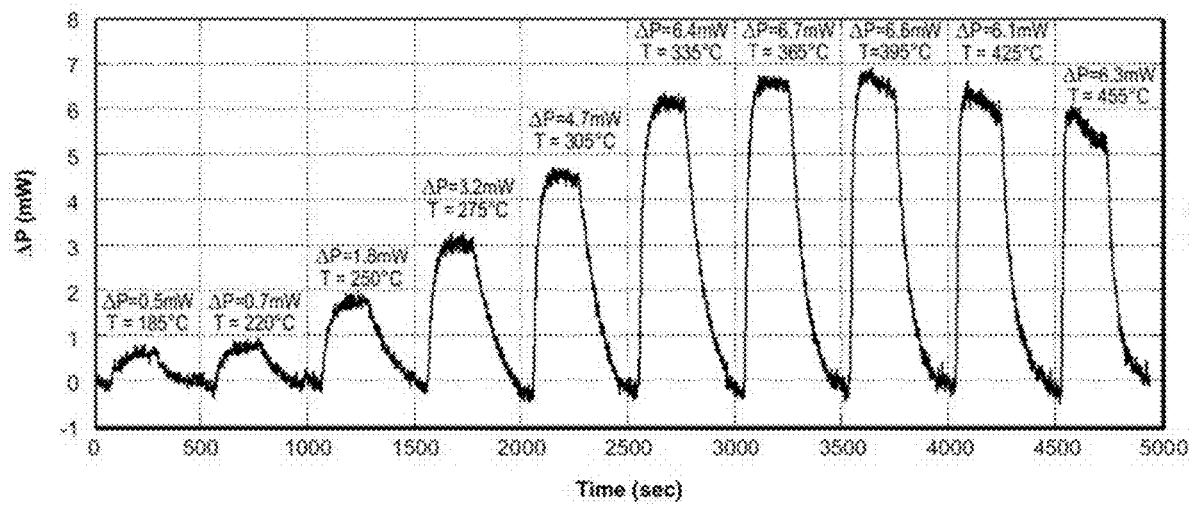
Figure 13A:
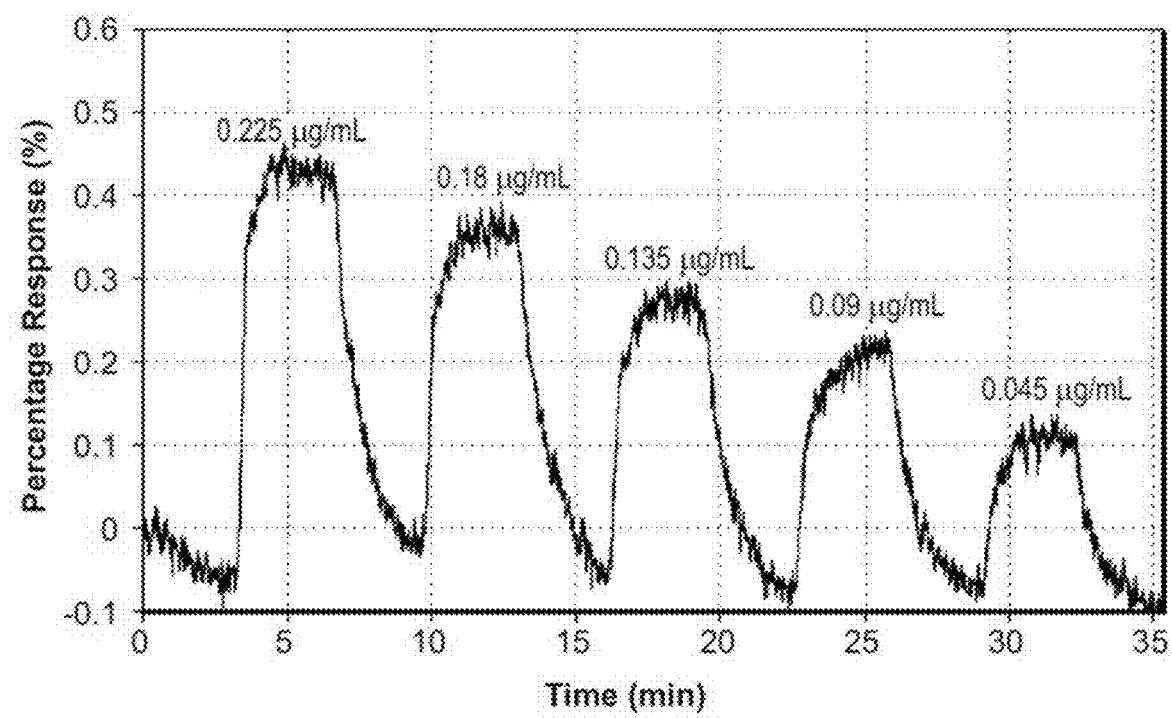
FIGS. 13A and 13B show illustrative graphical representations of responses of a 12 wt. % Pd nanocomposite to $H_2O_2$ (shown in FIG. 13A) and TATP (shown in FIG. 13B) as a function of concentration in the vapor phase.
Figure 13B:
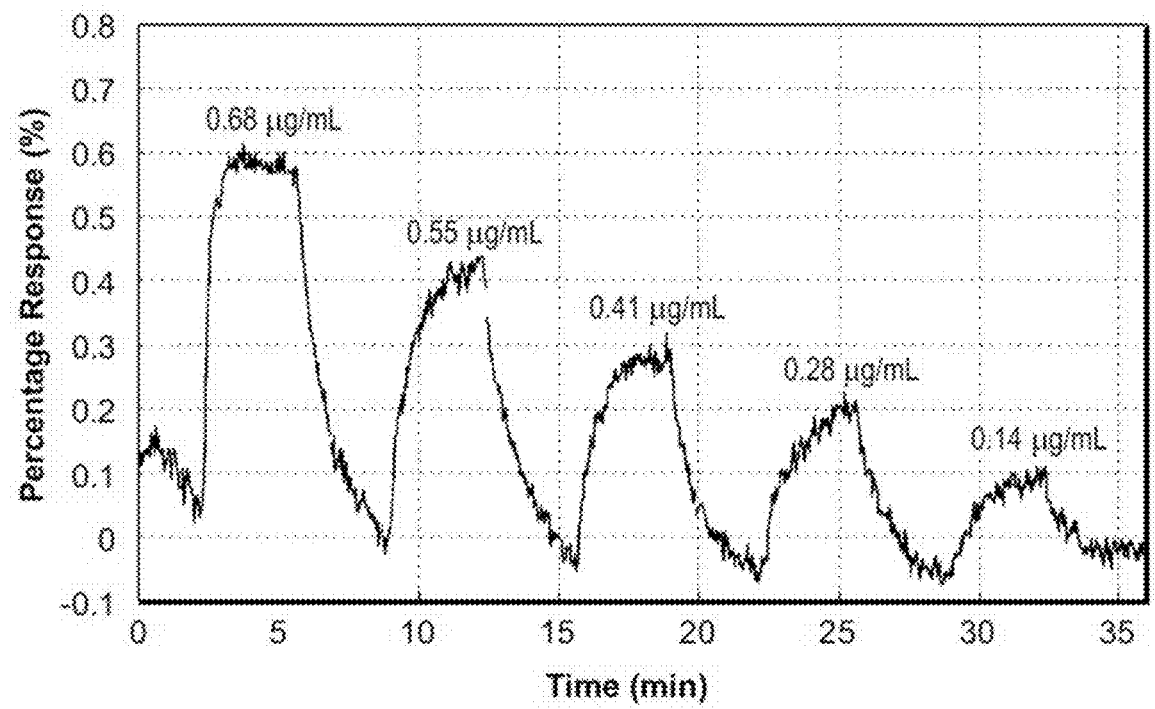

When similar tests were performed using palladium doped catalysts, different behavior (response versus temperature curves) was observed when the catalyst was exposed to $H_2O_2$ compared to TATP, as shown in FIGS. 12A and 12B respectively. The sensor clearly had a response to TATP at low temperature (185° C.-275° C.) and reached a maximum at 390° C. The catalyst, however, exhibited little or no response to $H_2O_2$ until 275° C., where a peak response at 455° C. was observed. A series of concentration tests, shown in FIGS. 13A and 13B, was performed in both $H_2O_2$ and TATP respectively to determine the sensitivity and detection limit of the sensor.

Figure 14:
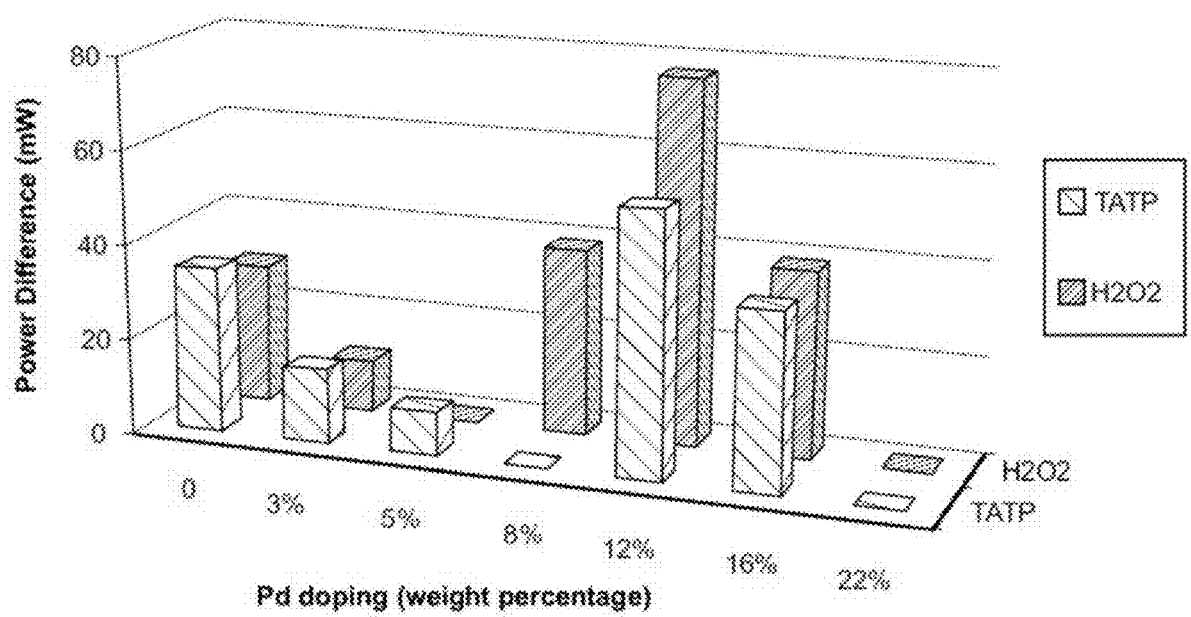
FIG. 14 shows an illustrative graphical representation of a response and selectivity of Pd:$SnO_2$ nanocomposite catalyst with various Pd loadings to $H_2O_2$ and TATP.

As shown in FIG. 14, the magnitude of the heat effect observed in a number of nanocomposite catalysts as a function of palladium loading in the presence of 0.68 μg/ml TATP and 0.225 μg/ml $H_2O_2$ is shown. At palladium loadings less than 8 wt. %, the sensors exhibit a relatively poor response compared to the un-doped $SnO_2$ catalysts. At higher palladium loadings, however, there was a substantial increase in sensor response, which abruptly decreased when more than 12 wt. % Pd was incorporated into the film. Catalysts with even higher palladium loadings showed almost no response to TATP and $H_2O_2$. While there was a substantial improvement in the maximum response to the two target molecules at a 12 wt. % palladium loading, the selectivity between these two target molecules was also significantly improved. A nanocomposite catalyst with an 8 wt. % palladium loading yielded the greatest selectivity ($H_2O_2$ relative to TATP) while a 12 wt. % palladium loading yielded the greatest sensitivity. Based on the XPS results, it is believed that a combined effect of metallic palladium and palladium monoxide improved the sensitivity of the $SnO_2$ catalyst.

Example 2

Figure 2:
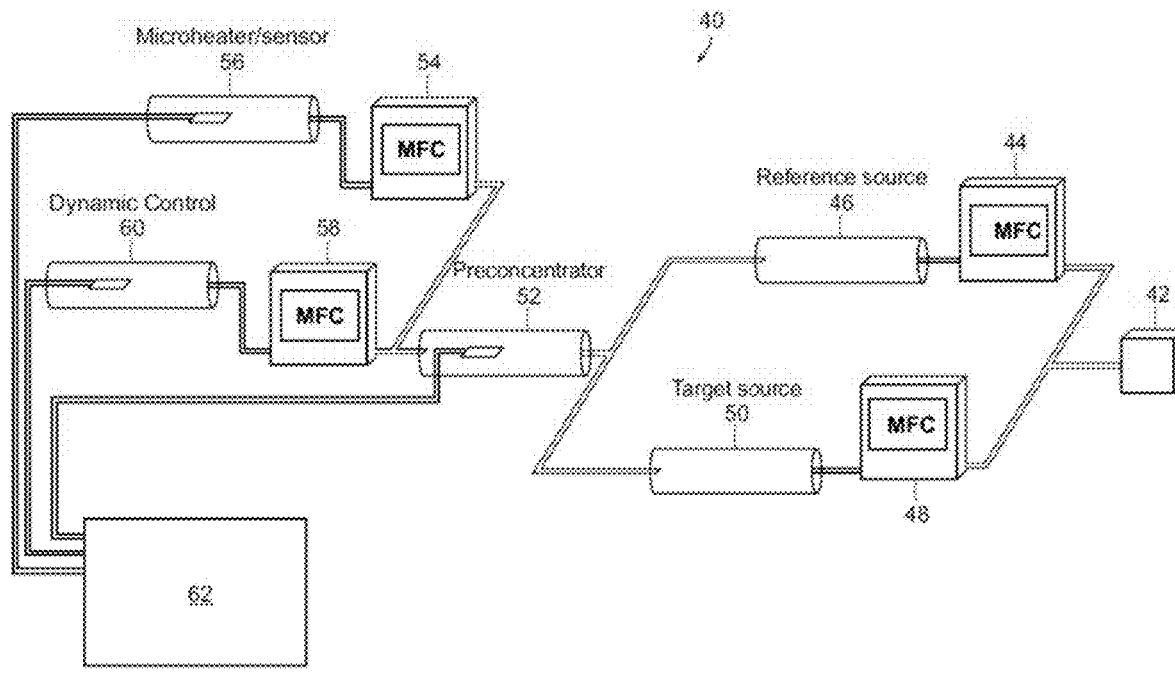
FIG. 2 shows an illustrative diagrammatic view of an apparatus used for the detection of TATP, $H_2O_2$ and acetone using a micro-calorimetric sensor in accordance with another embodiment of the present invention.
Figure 15:
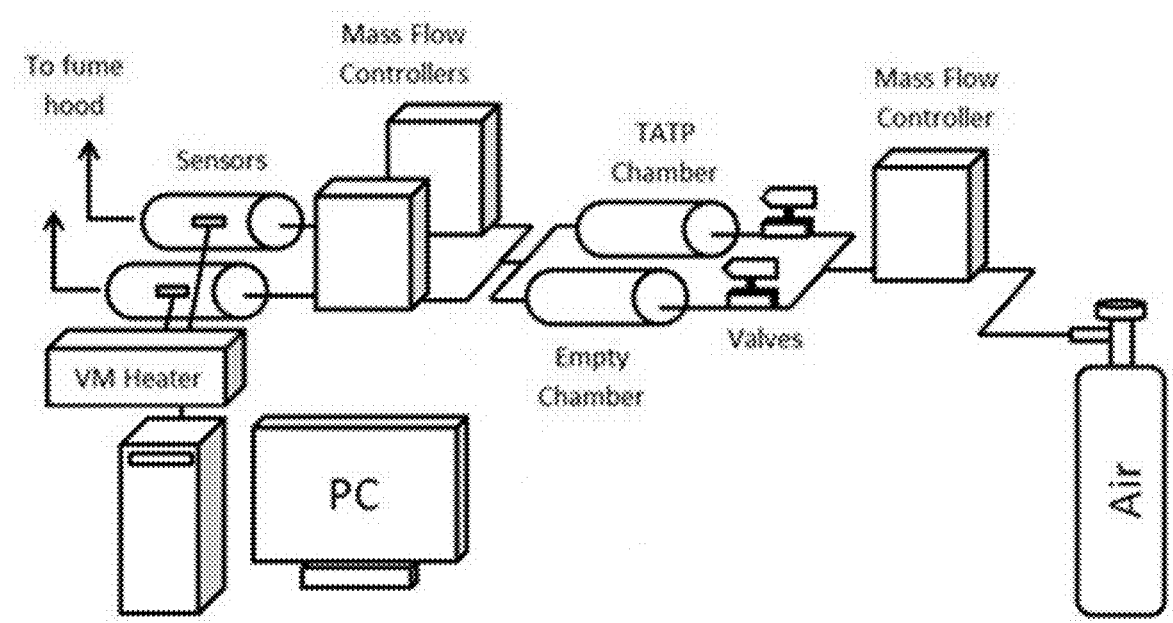
FIG. 15 is a schematic of an apparatus used to deliver and detect the presence of chemical compounds, such as the explosives TATP and 2,4-Dinitrotoluene (2,4-DNT), in the vapor phase.

A schematic of a different apparatus used for the detection of various compounds employing the thermodynamic sensor system of the present invention, similar to that of FIG. 2, is shown in FIG. 15. A digital control system preferably employing LabView software was used to set and control the temperature of a reference microheater and catalyst-coated microheater, which comprised ultrafine nickel coil with a diameter of 25 μm and a heating element length of about 1 cm, to pre-selected set points. Because a wire was used as the heating element, no substrate or passivation layer was required. Separate chambers were used for the catalyst-coated microheater and the reference microheater. The reference microheater is not responsive to the analyte, whereas the catalyst-coated microheater is responsive to the analyte. When the signal from the reference microheater was subtracted from the catalyst-coated microheater signal, any sensible heating effects in the system were preferably mitigated. Additional electronics were used to control the electrical power delivered to the microheaters, and the electrical resistance of the microheater was correlated with temperature based on the known temperature coefficient of resistance (TCR) of the microheater material. At the inlet of the apparatus dry air was fed to valves upstream from the chamber containing the analyte and adjusted such that all of the incoming air (carrier gas) passed through to the empty chamber, which dampened any fluctuations in flow rate. During a typical run, the manual valves were switched to the "on" position so that the carrier gas flowed only through a chamber containing the analyte. Two additional Alicat Scientific mass flow controllers (MFCs) were used to ensure equal flow rates to the reference sensor and the catalyst-coated microheater (sensor).

The digital control system was used to heat the catalyst-coated and reference microheaters to a series of predetermined arbitrary set point temperatures. The reference and catalyst-coated microheaters were held at a constant electrical resistance or constant temperature for a few minutes to reach thermal equilibrium and minimize signal drift before exposure to the chemical vapor of interest. After stabilization, valves were switched to the "on" position, such that all gas flow was diverted to the chamber containing the analyte. The carrier gas containing the explosive vapors flowed to the active sensor (catalyst-coated microheater) and the reference microheater. The heat generated or absorbed by the catalyst in the presence of the target gas was measured as the change in electrical power required to maintain the coil microheater at a constant temperature. A response commensurate with catalyst activity for a specific analyte was measured and recorded. A typical experiment was completed in several minutes, since it typically took that long for the sensor to reach peak power; that is, the time it took to reach equilibrium at each new temperature set point depended on the response to a specific analyte. It also took a few minutes for the sensor to return to its original baseline, once the analyte supply in the carrier gas had been depleted.

Figure 16:
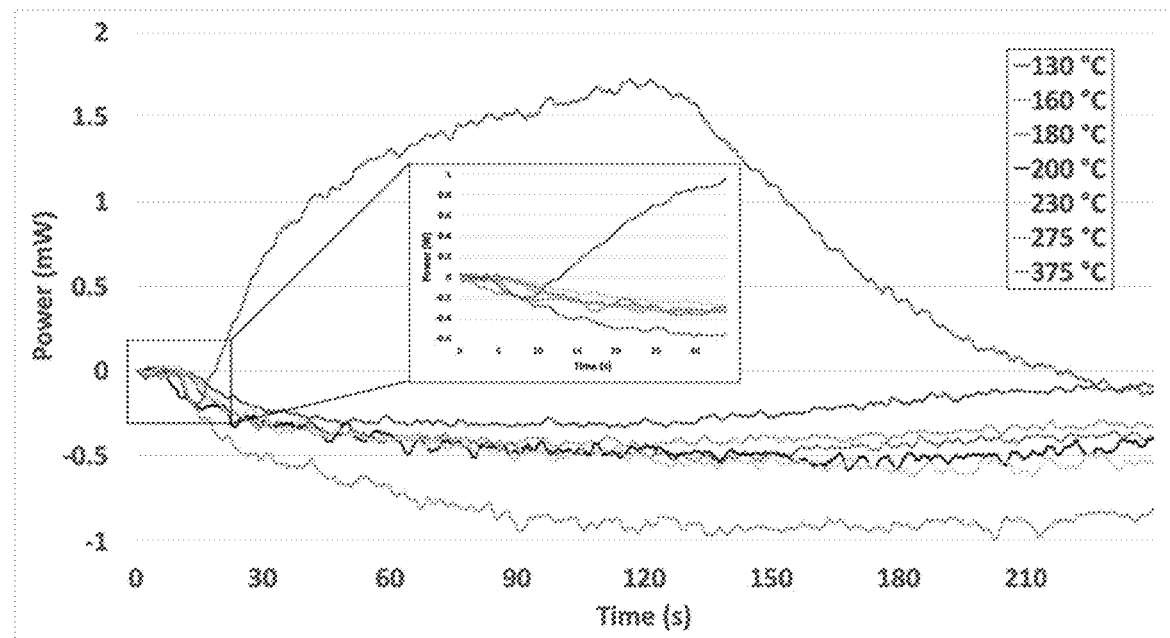
FIG. 16 shows sensor responses of a SnO catalyst to TATP in air at varying temperatures. The inset figure highlights the first 30 seconds of the experiment where the sensor temperature of 375° C. initially responded exothermically, before a much larger and more significant endothermic heat effect was observed.

The heat effects associated with detection appear to depend on oxidation-reduction reactions occurring on the surface of the metal oxide catalyst upon exposure to the molecule of interest. FIG. 16 shows the response of a SnO catalyst to 20 ppm TATP at a variety of temperatures set points. Each experiment was conducted according to the protocol described above. When the sensor was operated at temperatures of 275° C. and below, an exothermic response to TATP was observed. However, at 375° C., a large endothermic response was observed when exposed to TATP. It is believed that the exothermic response exhibited by the SnO sensor at low temperatures is due to the oxidation of SnO (i.e. oxidation of $Sn^{+2}$ to $Sn^{+4}$) in the presence of TATP. Conversely, the response of the sensor using a SnO catalyst shows that as the temperature increases, TATP is catalytically decomposed (375° C.) resulting in a reduction of the SnO catalyst (i.e. reduction of $Sn^{+4}$ to $Sn^{+2}$). These two heat effects compete with one another until the endothermic heat effect dominates. The steep curve highlighted in the inset of FIG. 16 represents the sensor response at a temperature of 375° C., which initially exhibits an exothermic trend associated with the lower-temperature sensor responses. After 20 seconds, the sensor begins to catalytically decompose the TATP and an endothermic heat effect is observed.

Figure 17:
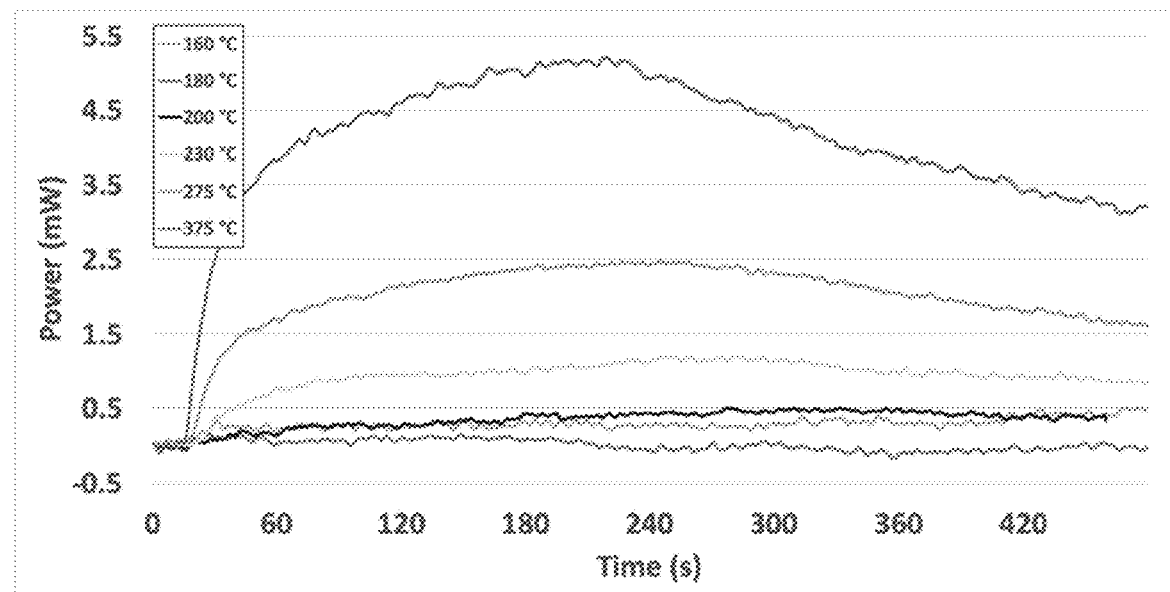
FIG. 17 shows sensor responses of a $SnO_2$ catalyst to 20 ppm TATP in air at varying temperatures.

To verify the selectivity of the sensing mechanism, the SnO catalyst-coated sensor was subjected to a high-pressure oxidation treatment to convert the SnO ($Sn^{+2}$) to $SnO_2(Sn^{+4})$. This oxidation treatment comprised heating the metal oxide to 600° C. for two hours in 2 atm of pure oxygen. The sensor was then exposed to TATP in a series of tests at various temperatures (identical to the procedure used above). The responses of the metal oxide catalyst after high-pressure oxidation treatment are shown in FIG. 17.

Unlike the responses shown in FIG. 16, the high-pressure oxidation treatment resulted in no exothermic response to TATP, but instead exhibited large endothermic responses at all temperatures above 200° C. That is, at temperatures below 200° C., no response to TATP vapor was observed, whereas at temperatures above 200° C. the responses were largely endothermic in nature. The absence of exothermic responses agrees with the proposed mechanism. Since the metal oxide was already converted to its most oxygen rich oxidation state, the catalyst could not be further oxidized. The endothermic responses exhibited by both the SnO and SnO$_2$ catalysts are a result of catalytic decomposition of the TATP molecule and the associated reduction of the oxide (reduction of Sn$^{+4}$ to Sn$^{+2}$ or Sn$^{+2}$ to Sn). Thus the exothermic response exhibited by the SnO sensor at low temperatures shown in FIG. 16 is due to the oxidation of SnO (conversion of Sn$^{+2}$ to Sn$^{+4}$) in the presence of TATP or its decomposition products, and the endothermic responses exhibited by the conversion of SnO to SnO$_2$ are a result of catalytic decomposition of the TATP molecule and its decomposition products and the associated reduction of the oxide (reduction of Sn$^{+4}$ to Sn$^{+2}$ or Sn$^{+2}$ to Sn).

Additional evidence that the metal oxide-analyte interactions are attributed to oxidation/reduction reactions at the metal oxide surface was provided by an activation energy analysis. For a SnO$_2$-TATP interaction, an activation energy was established and compared to the activation energy for the associated oxidation/reduction of the metal oxide. A rate constant was established at each temperature, where an endothermic response was observed and plotted as a function of reciprocal temperature to establish an activation energy for the SnO$_2$-TATP interaction. In this case, an activation energy of 16 Kcal/mol was established for TATP detection using the SnO$_2$ catalyst, which is about the same activation energy associated with the reduction of SnO$_2$ to SnO (conversion of Sn$^{+4}$ to Sn$^{+2}$) reported in the literature (15 Kcal/mol).

Figure 18:
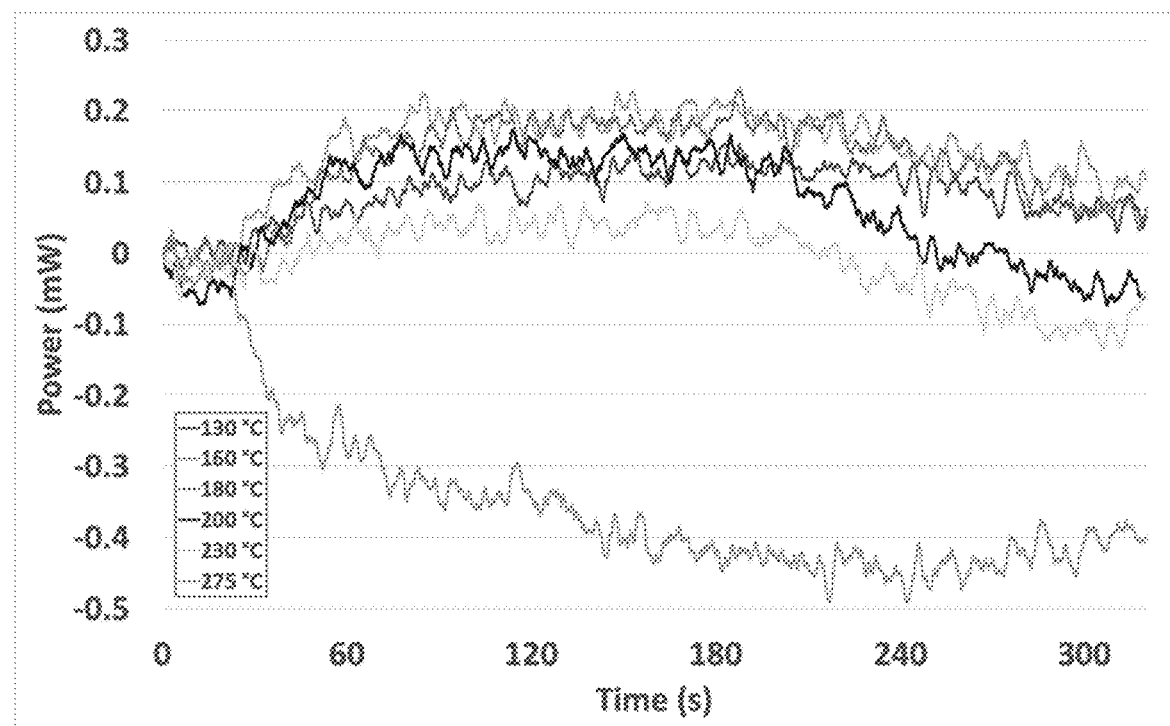
FIG. 18 shows sensor responses of a $Cu_2O$ catalyst to 20 ppm TATP in air at varying temperatures.
Figure 19:
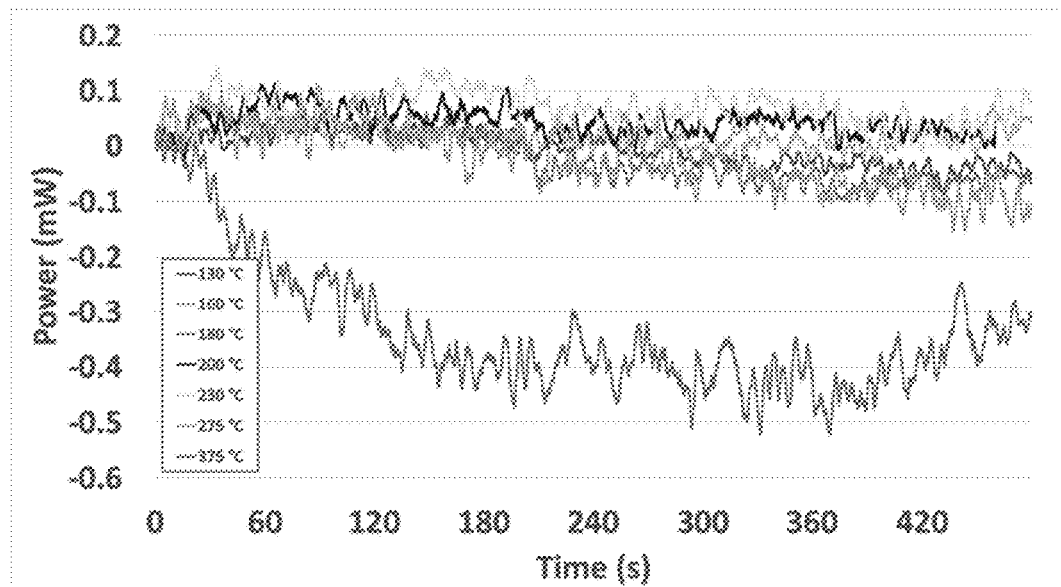
FIG. 19 shows sensor responses of a CuO catalyst to 20 ppm TATP in air at varying temperatures.

Similar experiments using Cu$_2$O and CuO catalysts instead of SnO catalysts were repeated, and the resulting activation energy for the detection process using these catalysts was compared to the activation energy associated with the oxidation/reduction of the metal oxides. A sensor microheater coated with a Cu$_2$O catalyst was exposed to TATP at various temperatures and the associated responses are shown in FIG. 18. Here, temperatures between 130° C. and 230° C. resulted in an endothermic response, but at 275° C. an exothermic response was observed. Similar to the responses using SnO and SnO$_2$ catalyst-coated sensors, it appears that the endothermic response when using the Cu$_2$O catalyst was a direct result of the decomposition of TATP and the simultaneous reduction of the metal oxide (reduction of Cu$^{+2}$ to Cu$^{+1}$) upon exposure to the analyte. Similarly, the exothermic response exhibited by the Cu$_2$O catalyst at low temperatures is due to the oxidation of the copper oxide (Cu$^{+1}$ to Cu$^{+2}$). The same process used to convert the SnO to SnO$_2$ (i.e. to convert Sn$^{+2}$ to Sn$^{+4}$) was used to convert the Cu$_2$O (Cu$^{+1}$) catalyst to CuO (Cu$^{+2}$). The curves shown in FIG. 19 were generated using this newly oxidized CuO sensor. Here, no endothermic response to TATP was observed using the CuO catalyst-coated sensor at low temperatures. At higher temperatures, both Cu$_2$O and CuO responded exothermically to TATP. Similarly, the exothermic response exhibited by the CuO catalyst at low temperatures is due to the oxidation of the copper oxide (Cu$^{+1}$ to Cu$^{+2}$). In an attempt to provide further evidence that these exothermic responses are due to the oxidation of the metal oxide, an activation energy based on the rate constant of individual exothermic response curves at different sensor temperatures (375-500° C.) was calculated using a Cu$_2$O catalyst that was exposed to TATP. The calculated activation energy was 8.0 Kcal/mol, which is similar to an activation energy of 9.6 Kcal/mol cited for the oxidation of Cu$_2$O reported in the literature. This further illustrates the unparalleled sensor selectivity of the present detection system, in that TATP does not endothermically respond when subjected to a different oxidation state of copper oxide, for example CuO.

Figure 20:
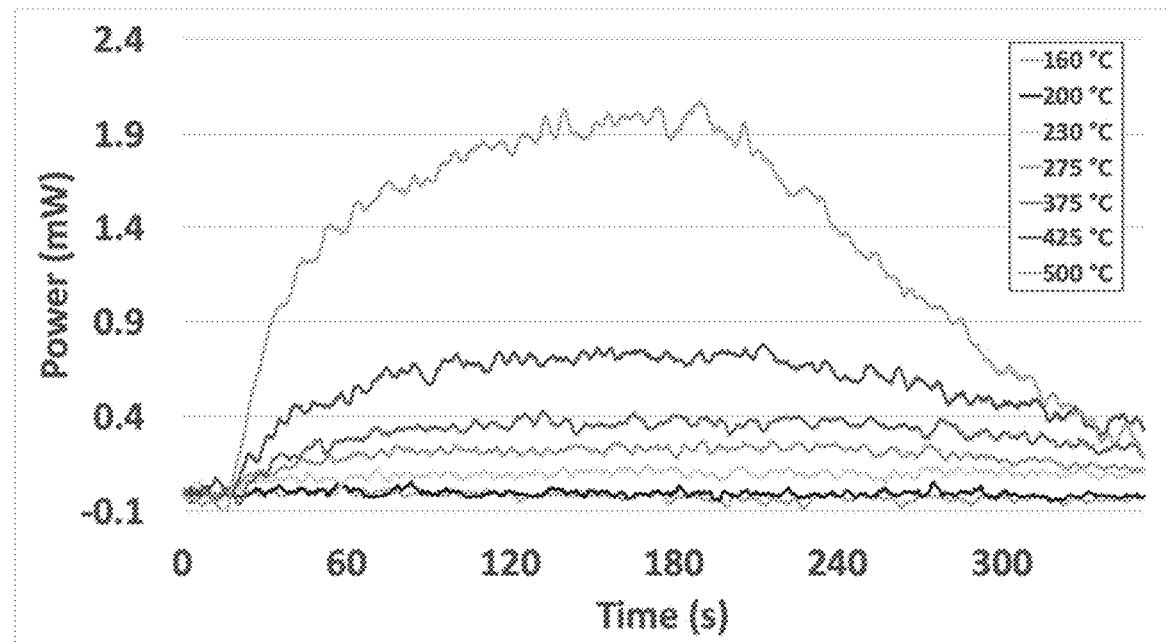
FIG. 20 shows sensor responses of a ZnO catalyst to 20 ppm TATP in air at varying temperatures.

To confirm that the changes in sensor response for tin oxide and copper oxide are due to oxidation state changes that occur during the high-pressure oxidation heat treatment, zinc oxide was also investigated as a catalyst in a similar series of experiments. Zinc oxide was chosen as the catalyst because there is only one known oxidation state for zinc oxide (Zn$^{+2}$). Therefore, exothermic reactions were not anticipated upon the introduction of TATP. Similarly, no oxidation state change was expected during any additional high-pressure oxidation heat treatment. FIG. 20 illustrates the response of the ZnO sensor (before heat treatment) exposed to 20 ppm TATP. At temperatures similar to those used for the tin oxide and copper oxide experiments (160-500° C.), only an endothermic response to the TATP was observed. After a high-pressure oxidation treatment similar to that used for the conversion of SnO and CuO to higher oxidation states, the ZnO catalyst-coated sensor exhibited similar behavior to those cases; that is, responses at all temperatures to TATP were endothermic in nature.

To provide further evidence that the detection mechanism for the thermodynamic sensor of the present invention is related to oxidation/reduction of the metal oxide used as a catalyst, an activation energy analysis was performed for the case where ZnO was reduced as the temperature was swept from 160-500° C. Accordingly, the activation energy associated with the sensor's response to TATP was approximately 19 Kcal/mol, which is consistent with the known activation energy for the reduction of ZnO to Zn metal of 24 Kcal/mol.

Figure 21:
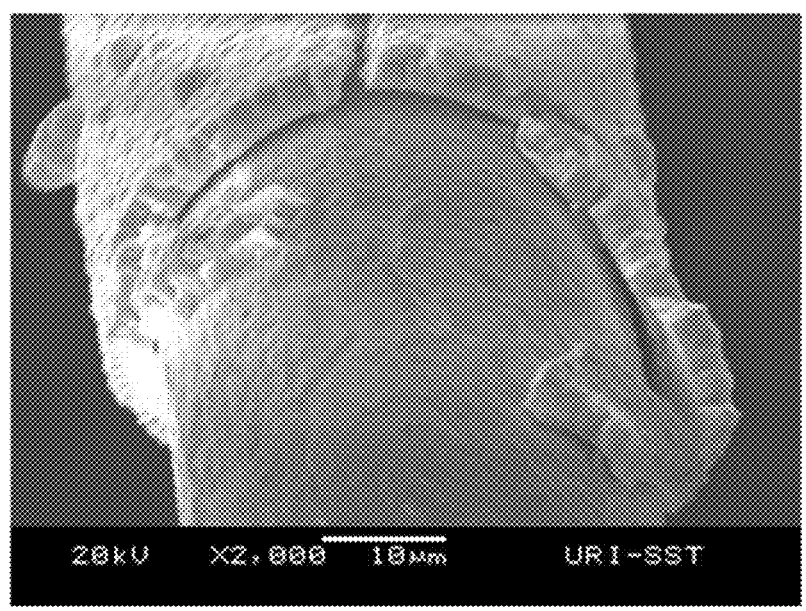
FIG. 21 is a SEM fractograph of a nickel microheater coated with a SnO catalyst after exposure to 20 ppm TATP vapor.

FIG. 21 shows an SEM micrograph of the fracture surface of a tin oxide coating deposited on A nickel microheater that was repeatedly cycled from room temperature to 500° C. During these thermal excursions, the SnO catalyst was exposed to TATP vapor. Here, the SnO surface exhibited relatively smooth, rounded protuberances with minimal surface area, typical of an as-sputtered film. It can be seen that the tin oxide coating has separated from the heater and developed some micro-cracks and consequently formed a small gap between the tin oxide and nickel wire, which was likely due to thermal stress developed in the coating as a result of thermal cycling. This gap may be where catalytic decomposition took place for these thermodynamic sensors. The columnar structure evident from the fracture surface indicates that the tin oxide coating (layer) closest to the nickel substrate is slightly lighter in color compared to the outer layer of the coating. Since these SEM's were taken in backscatter mode, where the contrast developed in the images is related to the atomic number of the atoms comprising the coating, a light area represents a lower oxygen content (i.e. a more metal rich area). Thus, the darker outer layer in the cross section of the micrograph suggests that this material may contain more oxygen and less metal than the inner layer. This color gradient further suggests that as the SnO catalyst is exposed to TATP vapor, it oxidizes. A typical as-sputtered SnO catalyst that has not been exposed to TATP vapor would have an identical composition to and an appearance similar to that of the innermost layer of the SnO catalyst shown in FIG. 21.

Figure 22A:
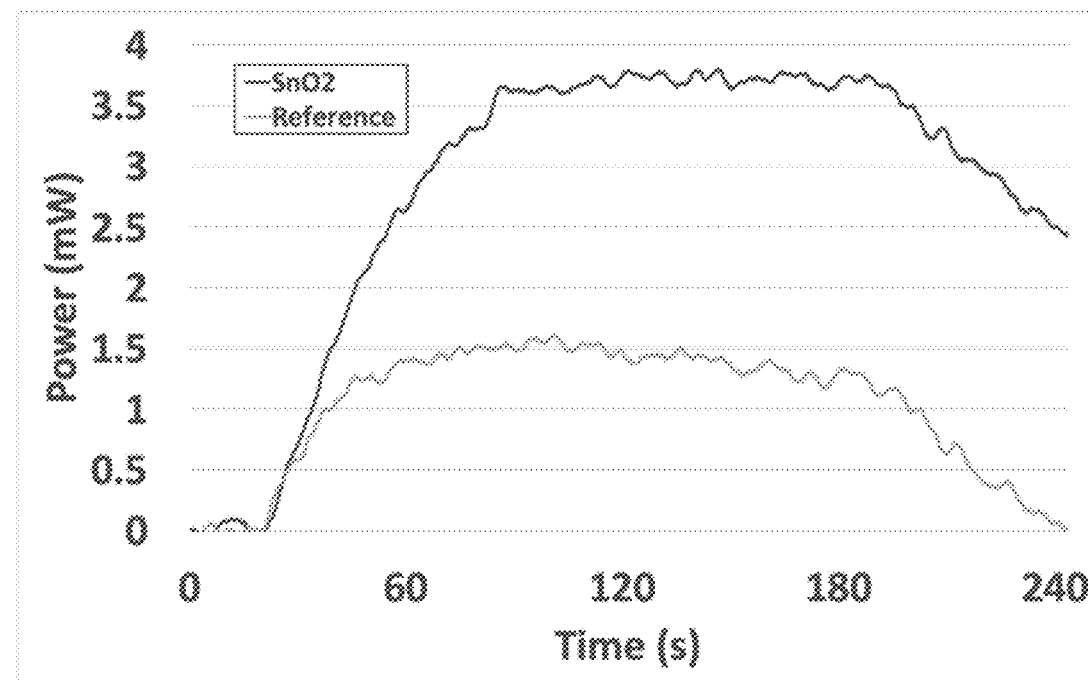
FIG. 22A shows thermodynamic sensor responses using a $SnO_2$ catalyst coated sensor and a reference sensor exposed to 2,4-DNT at 375° C.
Figure 22B:
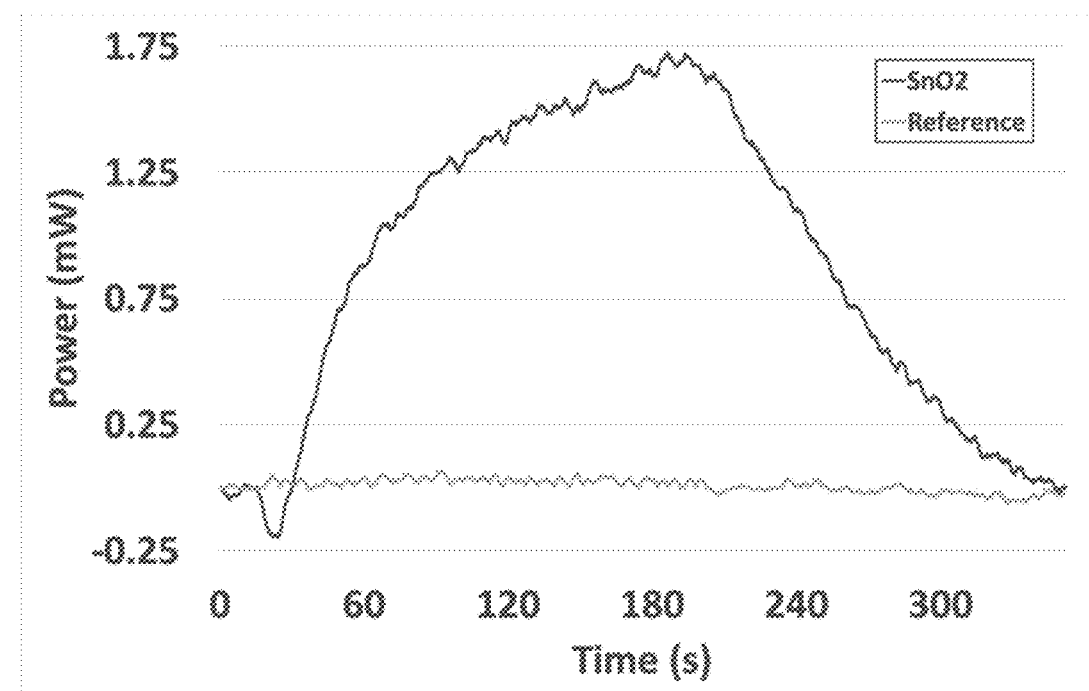
FIG. 22B shows thermodynamic sensor responses using a $SnO_2$ catalyst coated sensor and a reference sensor exposed to TATP at 375° C.

FIGS. 22A-22B show response curves of a thermodynamic sensor employing a SnO$_2$ catalyst (top curve) and a bare nickel reference (bottom curve) to two different explosives. In this experiment, both the reference sensor and the catalyst-coated sensor were held at 375° C. (constant temperature set point). FIG. 22A shows the sensor response to 2,4-DNT, while FIG. 22B shows the sensor response to TATP. Upon exposure to 2,4-DNT, both the reference and catalyst-coated sensor show significant endothermic heat effects due to the interaction with the analyte. These heat effects are associated with thermal decomposition of 2,4-DNT (higher temperatures promote thermal decomposition) and thus, the heat effect is not selective to the $SnO_2$ catalyst. Unlike 2,4-DNT, the sensor response to TATP is extremely selective to catalytic interaction and consequently no heat effect was observed for the reference sensor, while a significant endothermic heat effect was observed when the $SnO_2$ coated sensor was exposed to the explosive. Thus, the oxidation-reduction mechanism occurring during exposure to the analyte is specific/selective to the peroxide-based explosive and not the nitrogen-based explosive.

Example 3

Figure 23:
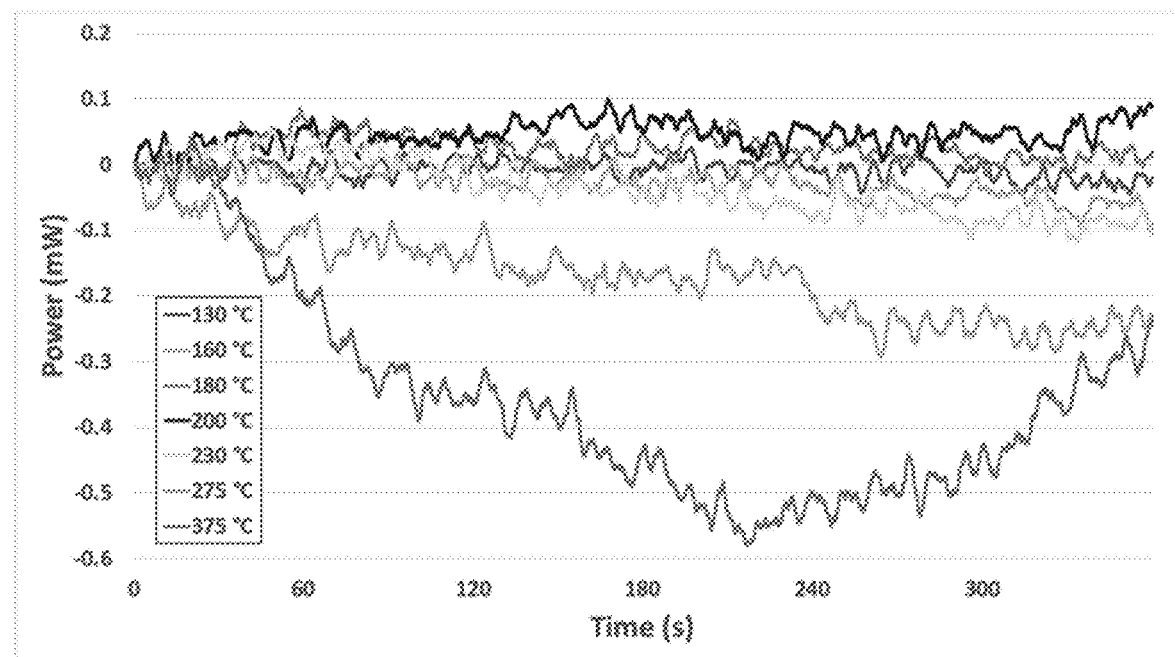
FIG. 23 shows sensor responses to cannabidiol (CBD) at varying temperatures using a $Cu_2O$ catalyst.
Figure 24:
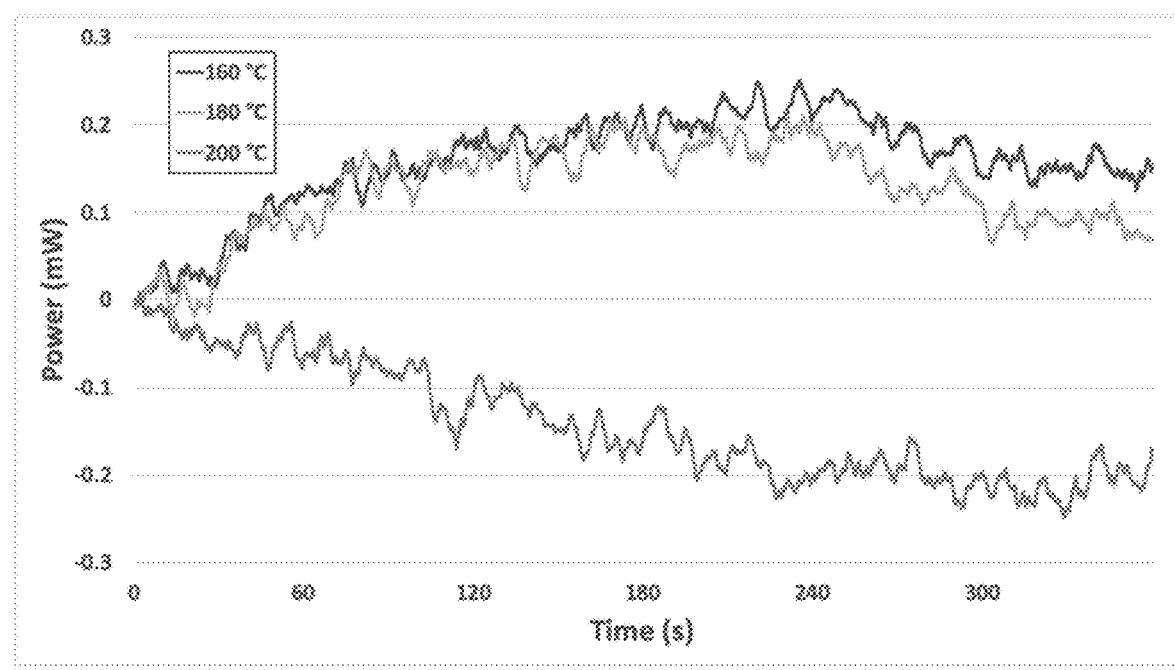
FIG. 24 shows sensor responses to CBD at varying temperatures using a SnO catalyst.

FIGS. 23-24 show the response of sensors comprising nickel wire heating elements, similar to those described in Example 2, coated with copper oxide and tin oxide, respectively, to CBD at various temperatures. Unlike the response to TATP, the $Cu_2O$ coated sensor showed exothermic responses at temperatures above 275° C.; that is, at temperatures below 275° C., no response to CBD vapor was observed, whereas at temperatures above 275° C. the responses were largely exothermic in nature. The exothermic responses exhibited by the $Cu_2O$ catalyst at high temperatures are due to the oxidation of the copper oxide ($Cu^{+1}$ to $Cu^{+2}$). The SnO coated sensor also exhibited responses that were selective to CBD. FIG. 24 shows that for temperatures below 200° C., the SnO coated sensor exhibited endothermic responses that are representative of catalytic decomposition of the CBD molecule. Conversely, at temperatures above 200° C. the sensor exhibited an exothermic response attributed to the oxidation of the catalyst (i.e. oxidation of $Sn^{+2}$ to $Sn^{+4}$).

Because the detection system was successfully able to detect CBD in the vapor phase despite its very low vapor pressure, and thus very low concentration in the vapor phase (3 ppt), this Example demonstrated that the sensing platform of the present invention can be implemented into a breathalyzer system for the detection of tetrahydrocannabinol (THC) or cannabidiol (CBD). Although CBD is non-psychoactive (unlike THC) it is still very prevalent in recreational marijuana and makes up 40% of the extract from cannabis sativa. Because the sensor measures the heat effect associated with the decomposition of the target molecule, the response is dependent on the size of the target molecule as well as the target molecule's decomposition products. Therefore, because CBD and THC are very similar in size and have similar functional groups, we can conclude that CBD is a sufficient simulant of THC for this detection system's testing purposes.

Example 4

Figure 25:
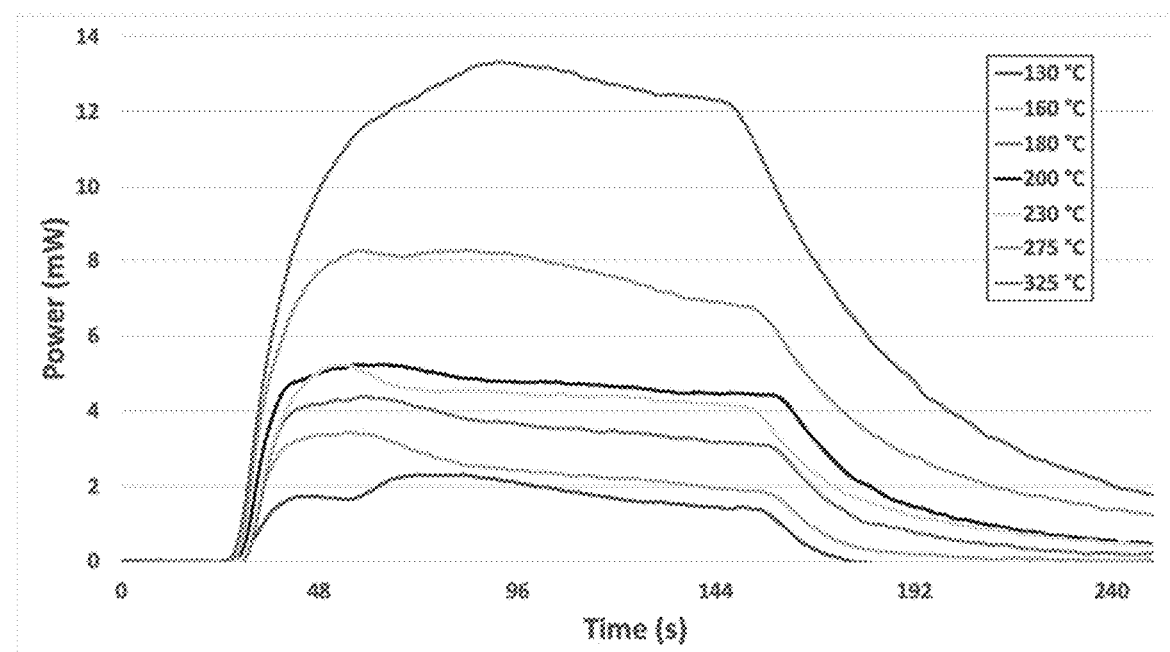
FIG. 25 shows sensor responses to acetone at varying temperatures using a SnO catalyst.

FIG. 25 shows the response of a SnO catalyst-coated sensor with a nickel wire microheater, similar to that described in Example 2, to acetone at various temperatures. Unlike the responses to TATP and CBD, the tin oxide sensor exhibited an endothermic response at temperatures between 130° C. and 325° C. These responses are unique to acetone and other ketones. Here, the catalytic decomposition of the acetone molecule resulted in the reduction of the tin oxide catalyst. Utilizing an array of catalyst coated microheaters, a distinct "fingerprint" can be generated leading to the selective identification of the particular ketone indicative of diabetes.

Currently, diabetic blood glucose monitoring requires obtaining a blood sample through the use of a lancet. The blood is then tested for blood glucose levels and the patient is advised whether or not to take insulin. A noninvasive approach would utilize the known concentration of ketones in the breath or skin of patients with diabetes. These ketone concentrations are known to be between 70-1000 PPM for those at clear risk of diabetes. The sensor system of this Example was able to detect the heat effect associated with the catalytic decomposition of these ketones, such as acetone. The sensor response is directly proportional to the concentration of ketone and thus can be used to differentiate the ketone levels required for diabetes as opposed to ketone levels in the breath or skin from other sources (such as diet and fasting). These sensor responses can then be correlated with a patient's blood glucose level to establish a noninvasive alternative to lancet based blood analysis. A device of this type, preferably employing an array of catalyst-coated microheaters, could be developed into a portable, noninvasive alternative to blood glucose monitoring of diabetic patients, perhaps as a breathalyzer or wearable.

Example 5

Figure 26:
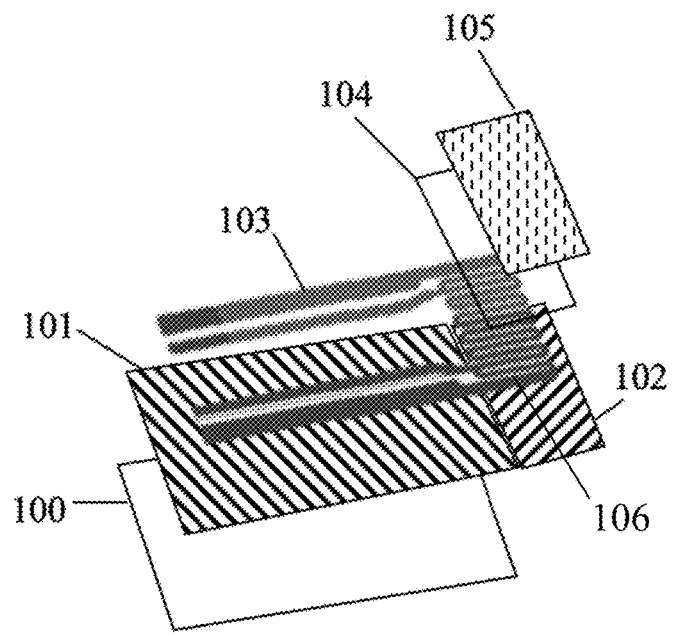
FIG. 26 is a schematic of an embodiment of a sensor of the present invention with a free-standing heating element.

FIG. 26 is a schematic showing an expanded view of a thermodynamic sensor comprising a free-standing thin film heating element. The unique methodology used to fabricate the sensor relies on the solid solubility differences of Cu in Pd and Pt in Pd, and/or a differential solution mechanism. Prior to fabrication, substrate 100 comprising yttria-stabilized zirconia (YSZ), about 10 microns thick, was cleaned by heating to 1000° C. in a tube furnace for 3 hours to remove any organic contaminants. Next, photoresist-based microheater patterns were transferred directly onto the substrate using standard photolithography techniques. A developer solution was utilized to create windows in the photoresist. A 500 Å copper (Cu) adhesion layer 102 was then sputter-deposited onto the portion of substrate 100 intended to lie under serpentine heating element 106 of the microheater. A 500 Å platinum (Pt) adhesion layer 101 was sputter-deposited onto portion of substrate 100 intended to lie under lower leads (leadouts) 103 and bond pads of the microheater. A 0.5 μm thick layer of palladium (Pd) was sputter-deposited onto the Cu adhesion layer 102 and Pt adhesion layer 101 in a single step. After Pd deposition, the excess Pd was removed via liftoff, leaving a Pd thin film microheater comprising attached bond pads, lower leads 103, and heating element 106. The pre-developed photoresist windows enabled the Pt adhesion layer 101 and Cu adhesion layer 102, as well as the Pd metallization for the lower leads 103, bond pads, and heating element 106 to be deposited directly on the substrate, and thus remain adhered after liftoff. A 500 Å alumina passivation layer 104 was then deposited over heating element 106, followed by catalyst layer 105 (about 0.9 μm thick). These materials and dimensions were specific to this example only; other materials and dimensions may be used.

The sensors were then placed in an annealing furnace for 5 hours at a temperature of 350° C. At 350° C., copper readily diffuses into Pd to form a complete substitutional solid solution with the Pd in a single homogenous phase. Once in solution, the copper is no longer available in adhesion layer 102 to provide adhesion, enabling the Pd-based heating element 106 to pull away from the surface of substrate 100. Heating element 106 subsequently comprised a single Pd/Cu homogenous phase, comprising approximately 70% Pd and 30% Cu. The lack of Pt solubility in Pd at these temperatures meant that the phase boundary between Pt adhesion layer 101 and Pd lower leads 103 remained intact. Thus, adhesion layer 101 remained adhered to the surface of the substrate, keeping lower leads 103 and the bond pads attached to substrate 100. This adhesion layer also promoted structural rigidity of the lower leads and bond pads. The substrate 100 located underneath the free-standing heating element 106 could be carefully removed from the rest of the sensor by a razor blade, thus it no longer contributed to the thermal mass of heating element 106. Thereafter the microheater was attached to the substrate only where the electrical leads make contact to the thin film bond pads. Because heating element 106 of the microheater was free from the substrate surface, the thermal mass and the heat sinking associated with the substrate was minimized. The free-standing heating element was less than about 2 μm thick, representing the practical limit of thermal mass (less than about 0.5 μg). Because of the drastic reduction in thermal mass, sensitivity and response time are maximized, while the adhesion of lower leads 103 to the substrate maintained durability and maneuverability.

Figure 27:
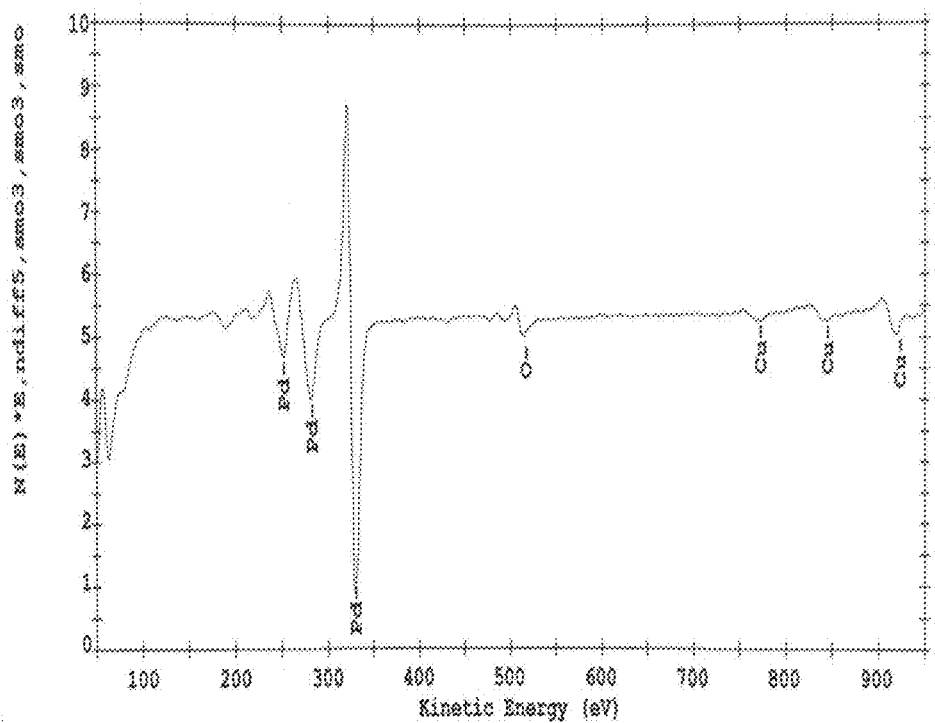
FIG. 27 is XPS data taken from the heating element of FIG. 26.

In order to validate the formation of the Cu/Pd solid solution, X-Ray Photoelectron Spectroscopy (XPS) analysis at a depth of 50 Å was completed on heating element 106, shown in FIG. 27. The atomic concentration results are listed in Table 3. The results confirm the presence of a high concentration of Pd (69.31%) in addition to a small concentration of Cu (18.71%), thus a single Pd/Cu solid solution.

TABLE 3

Atomic concentration

| Element | Peak-to-peak | Sensitivity Factor | Concentration (%) |
|---|---|---|---|
| O1 | 4392574 | 0.338 | 11.98 |
| Cu1 | 5288049 | 0.260 | 18.71 |
| Pd1 | 66383399 | 0.882 | 69.31 |

Figure 28:
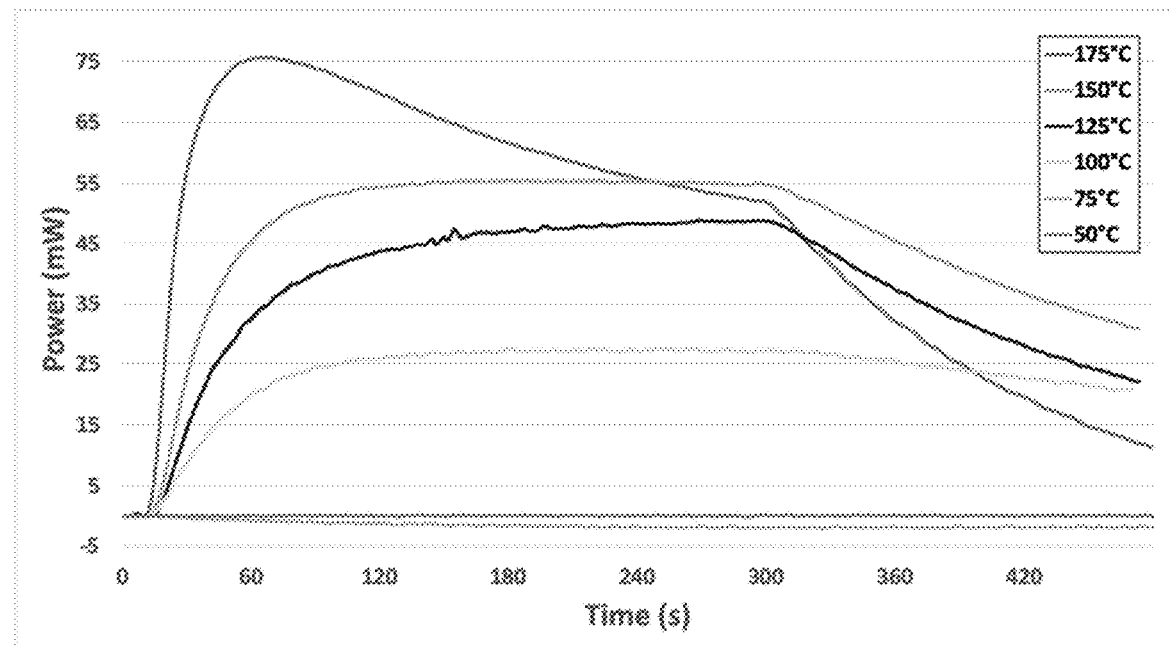
FIG. 28 shows the response of the sensor of FIG. 26 with a SnO catalyst to TATP at a variety of temperature set points.

Because of the extremely low mass of the microheater, heat is efficiently transferred through free-standing heating element 106 to the catalyst. This localized heat distribution enables analyte detection at dramatically lower temperatures than previously described, with improved sensitivity and response time. FIG. 28 shows the response of a free-standing, thin-film sensor employing a SnO catalyst to TATP at a variety of temperature set points. The exothermic and endothermic responses are indicative of the sensing mechanism described above. When the sensor was operated at 75° C. or below, an exothermic response to TATP was observed. However, at 175° C., a large endothermic response was observed. This transition from exothermic to endothermic response occurred at a drastically reduced operating temperature (about 100° C.) when compared to the low thermal mass sensor comprising a nickel wire heating element (about 375° C.). The large difference in operating temperature can be attributed to the 9500% reduction in thermal mass of the sensor platform. This significant decrease in operating temperature means the power required to operate the sensor is dramatically decreased, enabling the sensor to function in a handheld device.

Figure 29:
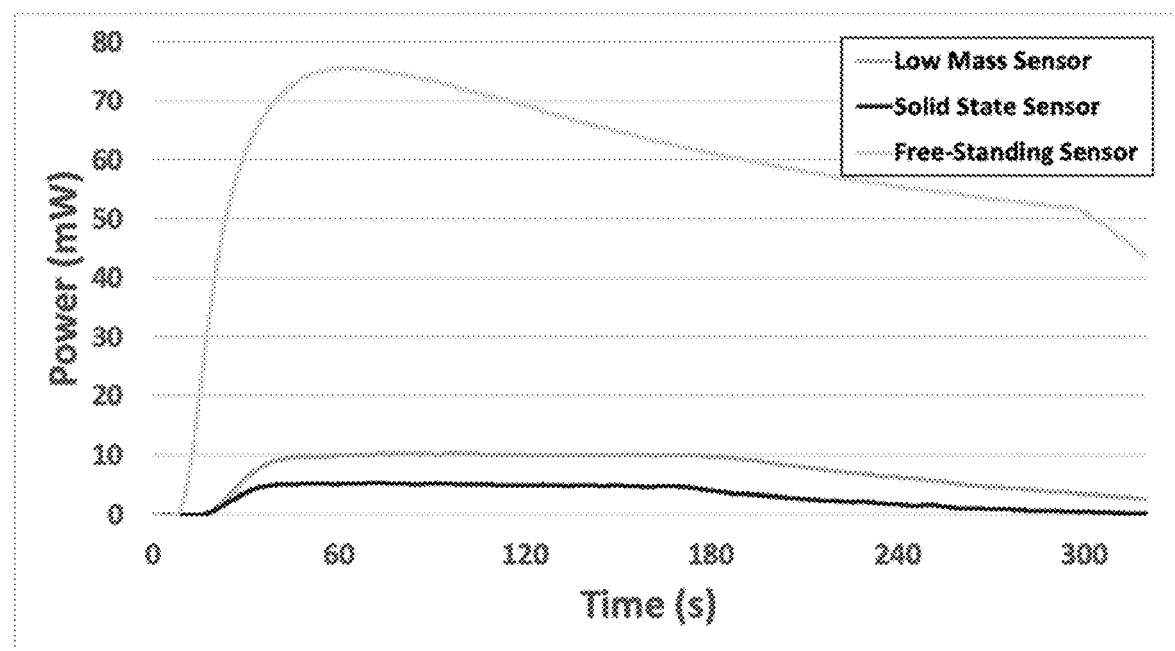
FIG. 29 compares the responses of three different sensors to 20 ppm TATP.

FIG. 29 compares the responses of three different sensors to 20 ppm TATP. Here, the low mass sensor of Examples 2-4 and the solid state sensor of Example 1 were heated to an operating temperature of 500° C. upon detection of the analyte. The low mass and solid states sensors displayed responses of about 10 mW and 5 mW respectively. Meanwhile, at a considerably lower operating temperature (175° C.), the free-standing sensor displayed a maximum response of about 75 mW upon interaction with the analyte. Despite the substantial difference in required operating temperature, the free-standing heating element produced unprecedented levels of sensitivity, and may eventually achieve single molecule detection in the vapor phase.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. A method of detecting an analyte, the method comprising:
    depositing each of a plurality of catalysts on a separate low thermal mass heating element;
    heating the low thermal mass heating elements to a plurality of temperatures;
    contacting the catalysts with a sample;
    reacting the catalysts with one or more chemical compounds in the sample or with catalytic decomposition products of one or more of the chemical compounds;
    measuring a sign of a heat of reaction for each catalyst at each temperature;
    comparing the measured heat of reaction sign at each temperature obtained for each of the catalysts with predetermined data; and
    determining if the analyte is present in the sample.

2. The method of claim 1 wherein the sample is gaseous.

3. The method of claim 1 wherein all of the catalysts are different.

4. The method of claim 1 wherein at least two of the catalysts are the same.

5. The method of claim 1 further comprising:
    measuring a magnitude of the heat of reaction for each catalyst at each temperature; and
    comparing the measured heat of reaction magnitude at each temperature obtained for each of the catalysts with predetermined data.

6. The method of claim 1 comprising comparing power required to keep each low thermal mass heating element at each temperature with power required to keep an identical low thermal mass heating element but without a catalyst at the same temperature.

7. The method of claim 1 wherein the catalysts comprise metal oxides.

8. The method of claim 7 wherein the metal oxides are selected from the group consisting of tin oxide, copper oxide, titanium oxide, tungsten oxide, manganese oxide, iron oxide, and zinc oxide.

9. The method of claim 1 wherein each heating element comprises a wire.

10. The method of claim 9 wherein the wire has a diameter of 25 μm and comprises nickel.

11. The method of claim 9 wherein the heating element has a length of about 1 cm.

12. The method of claim 1 wherein each heating element comprises a thin metallic film.

13. The method of claim 12 comprising depositing a passivation layer on each of the low thermal mass heating elements prior to depositing the catalysts.

14. The method of claim 13 wherein the passivation layer comprises a thermodynamically stable material with high dielectric breakdown strength.

15. The method of claim 13 wherein the passivation layer comprises alumina, hafnia, or silica.

16. The method of claim 1 wherein one or more of the catalysts have multiple oxidation states.

17. The method of claim 16 wherein reaction between one or more of the catalysts and at least one of the chemical compounds changes the oxidation state of the one or more catalysts.

18. The method of claim 16 wherein reaction between one or more of the catalysts and one or more catalytic decomposition products of at least one of the chemical compounds changes the oxidation state of the one or more catalysts.

19. The method of claim 1 wherein the heating elements are not in thermal contact with a substrate.

20. The method of claim 1 capable of detecting a concentration of the analyte in the sample of less than 1 ppb.

21. The method of claim 20 capable of detecting a concentration of the analyte in the sample of less than 10 ppt.

22. The method of claim 1 wherein a mass of each low thermal mass heating element is less than 1 mg.

23. The method of claim 22 wherein the mass of each low thermal mass heating element is less than 45 μg.

24. The method of claim 23 wherein the mass of each low thermal mass heating element is less than 10 μg.

25. The method of claim 1 wherein the analyte is selected from the group consisting of triacetone triperoxide (TATP), diacetone diperoxide (DADP), 2,4 -Dinitrotoluene (2,4-DNT), acetone, hydrogen peroxide, tetrahydrocannabinol (THC), cannabidiol (CBD), ethanol, ketones, peroxides, pollutants, pharmaceuticals, hydrocarbons, and alcohols.

* * * * *